June 8, 1954   G. N. SMITH   2,680,400
STEREOSCOPIC CAMERA
Filed July 3, 1950   10 Sheets-Sheet 1
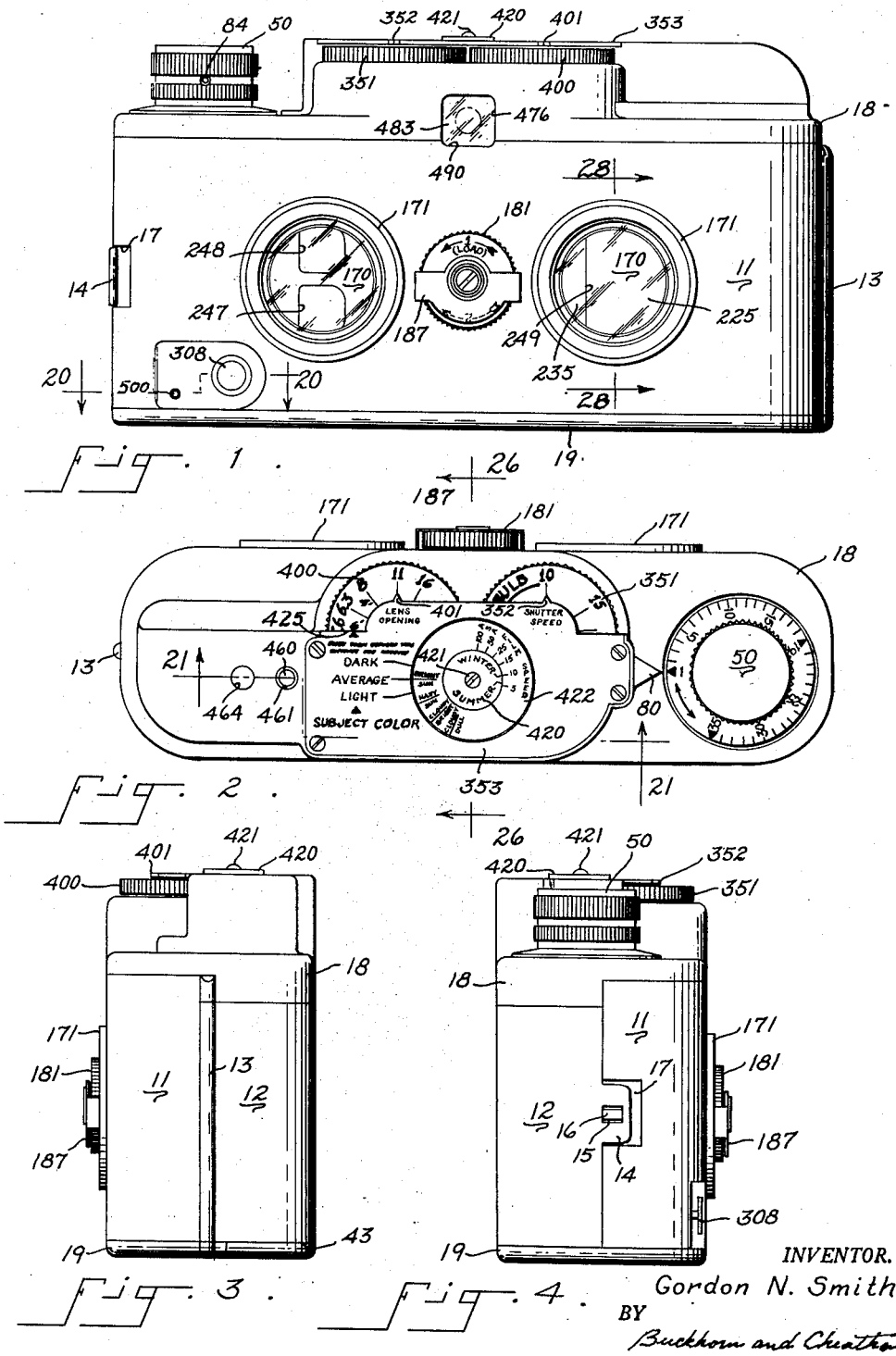
INVENTOR.
Gordon N. Smith
BY Buckhorn and Cheatham
Attorneys June 8, 1954
G. N. SMITH
2,680,400
STEREOSCOPIC CAMERA
Filed July 3, 1950
10 Sheets-Sheet 2
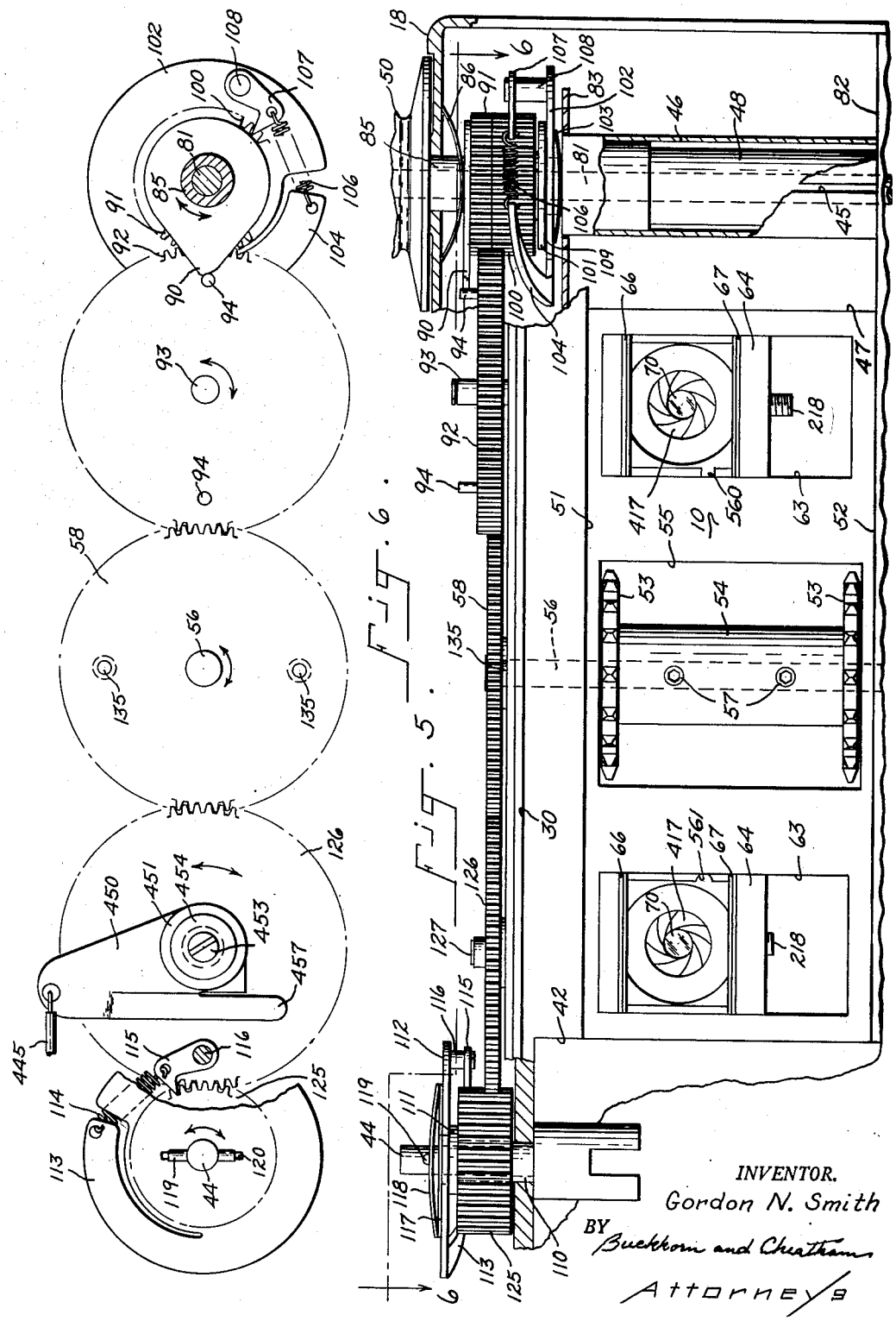
INVENTOR.
Gordon N. Smith
BY Buckhorn and Cheatham
Attorneys

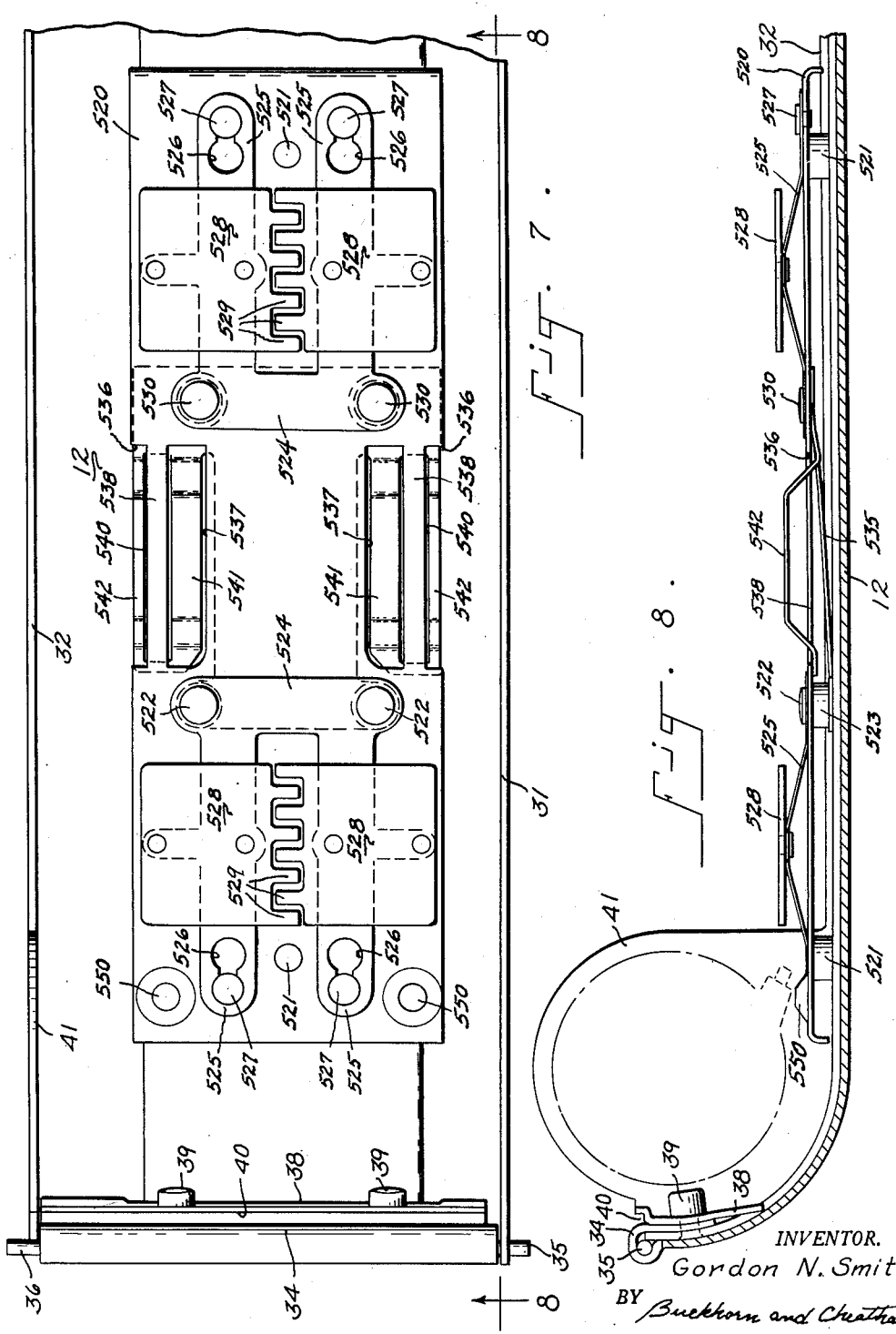

June 8, 1954   G. N. SMITH   2,680,400
STEREOSCOPIC CAMERA
Filed July 3, 1950   10 Sheets-Sheet 4
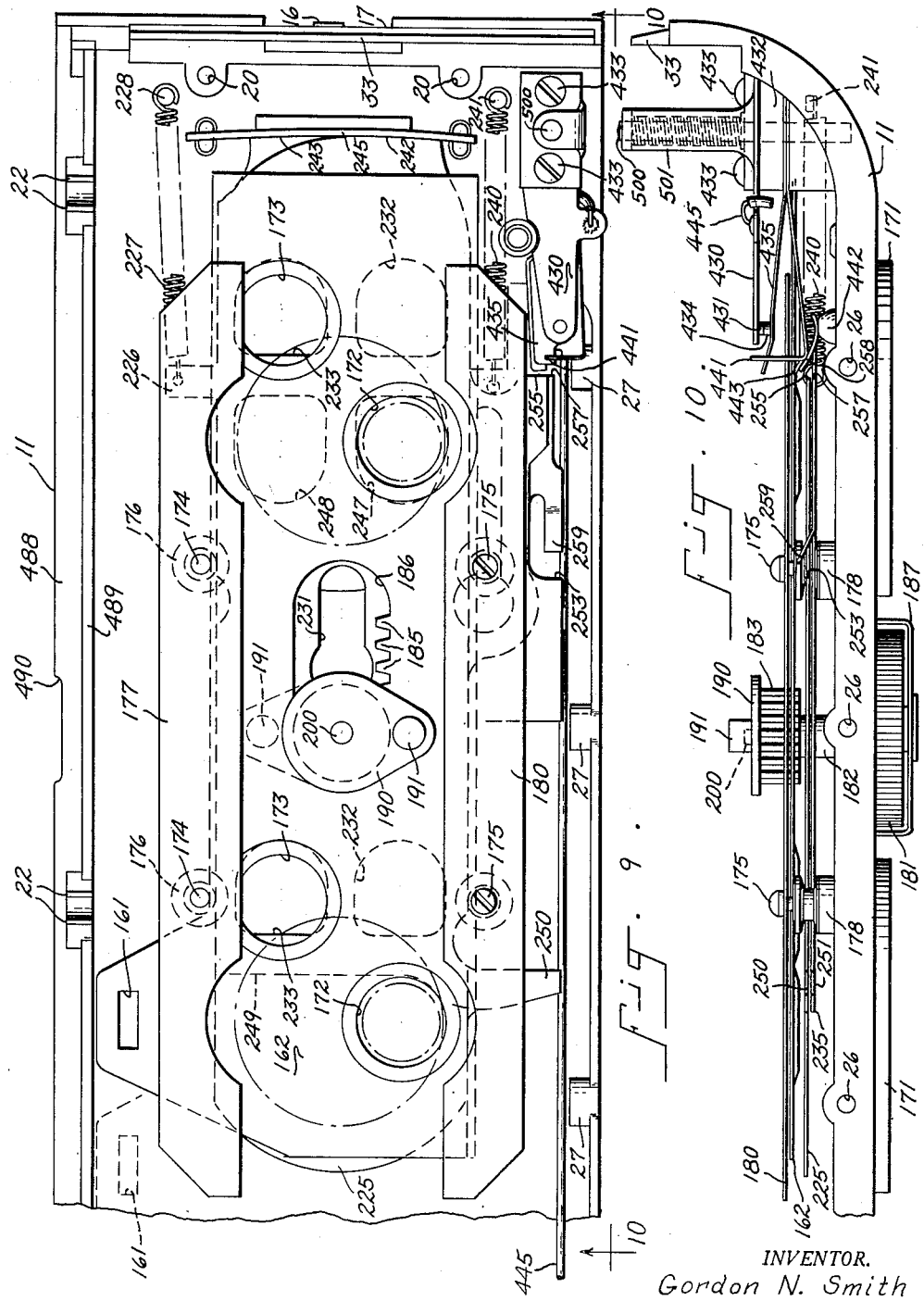
INVENTOR.
Gordon N. Smith
BY Buckhorn and Cheatham
Attorneys

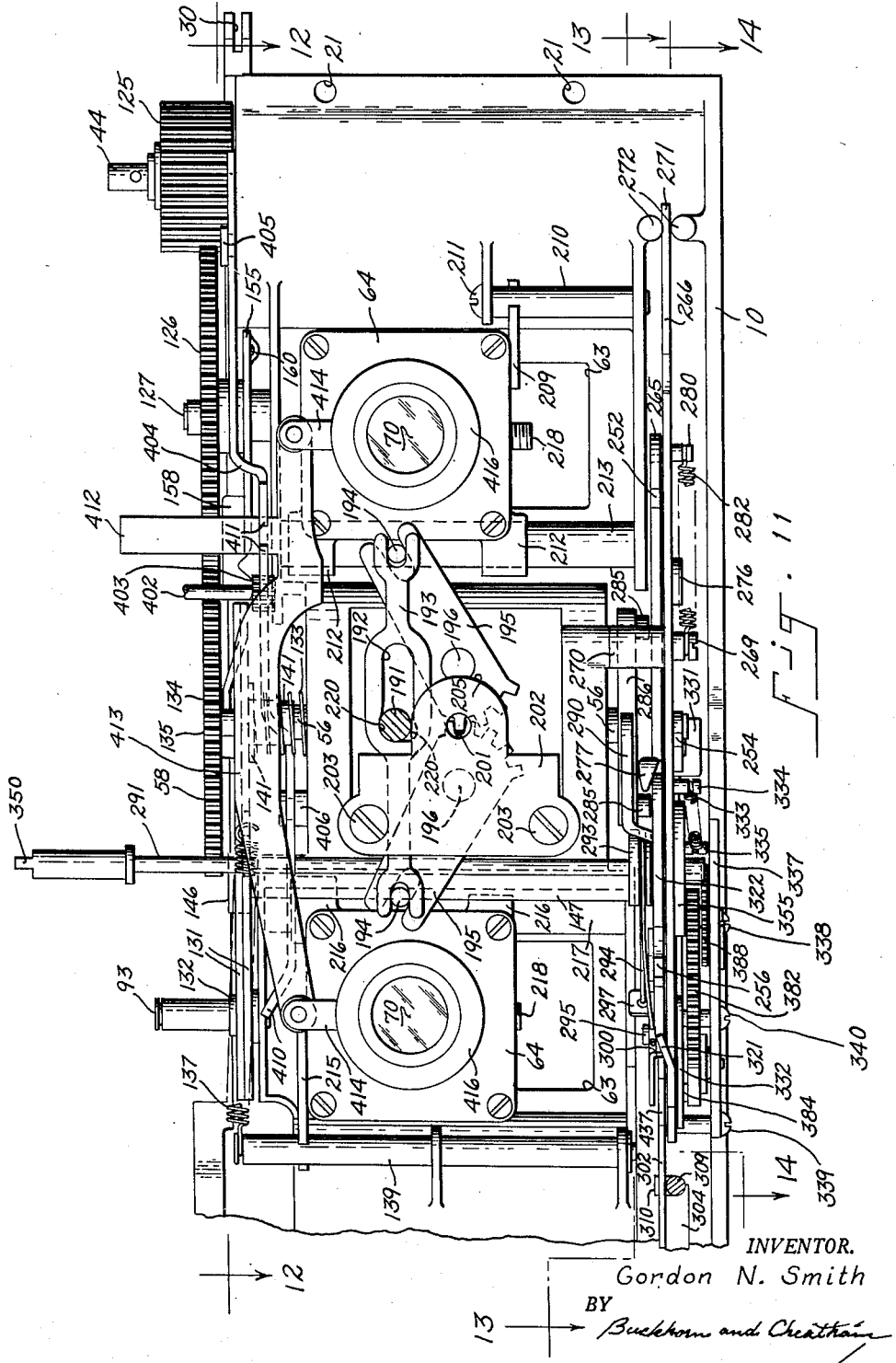

June 8, 1954
G. N. SMITH
2,680,400
STEREOSCOPIC CAMERA
Filed July 3, 1950
10 Sheets-Sheet 6
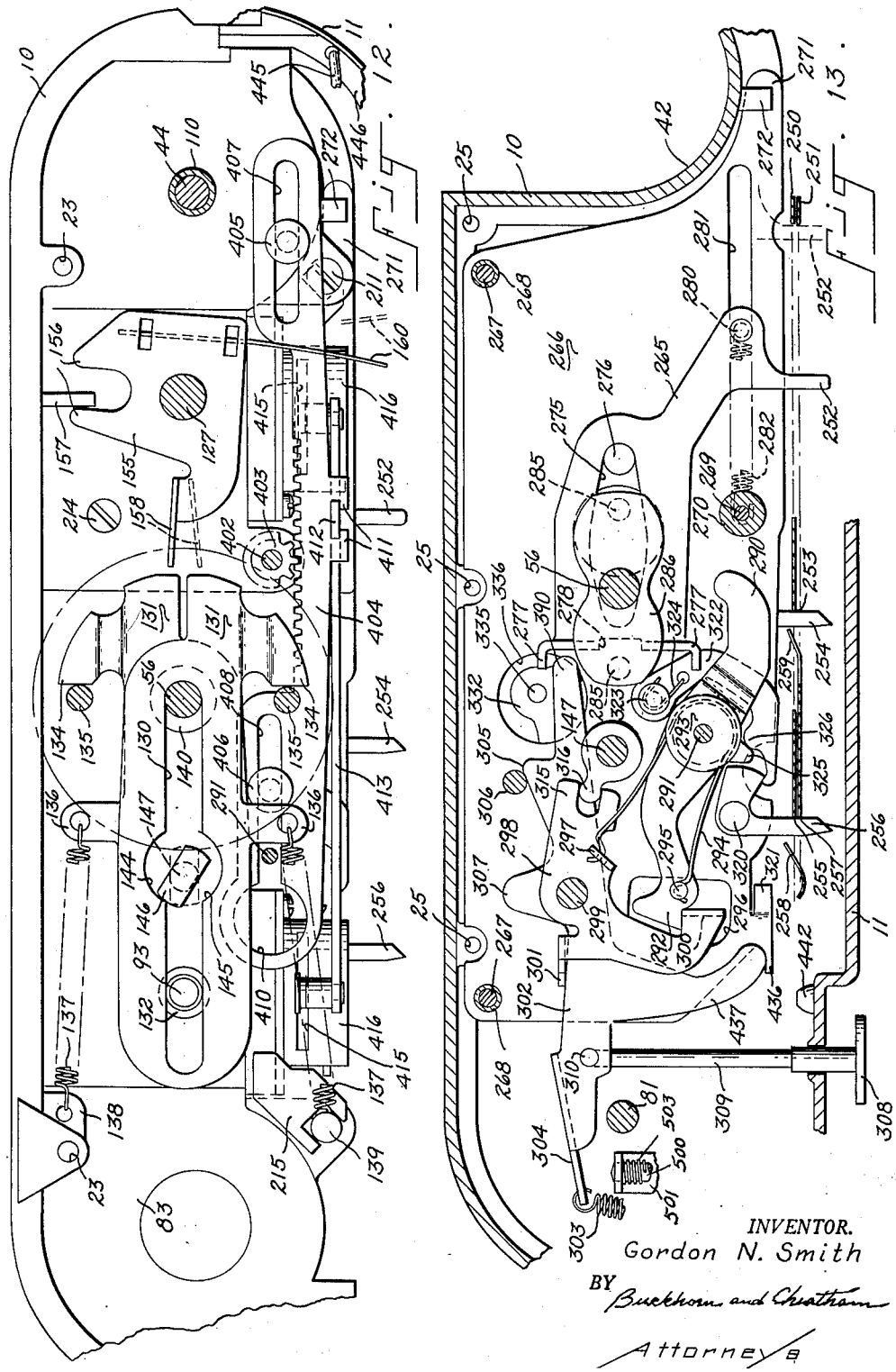
INVENTOR.
Gordon N. Smith
BY Buckhorn and Cheatham
Attorneys

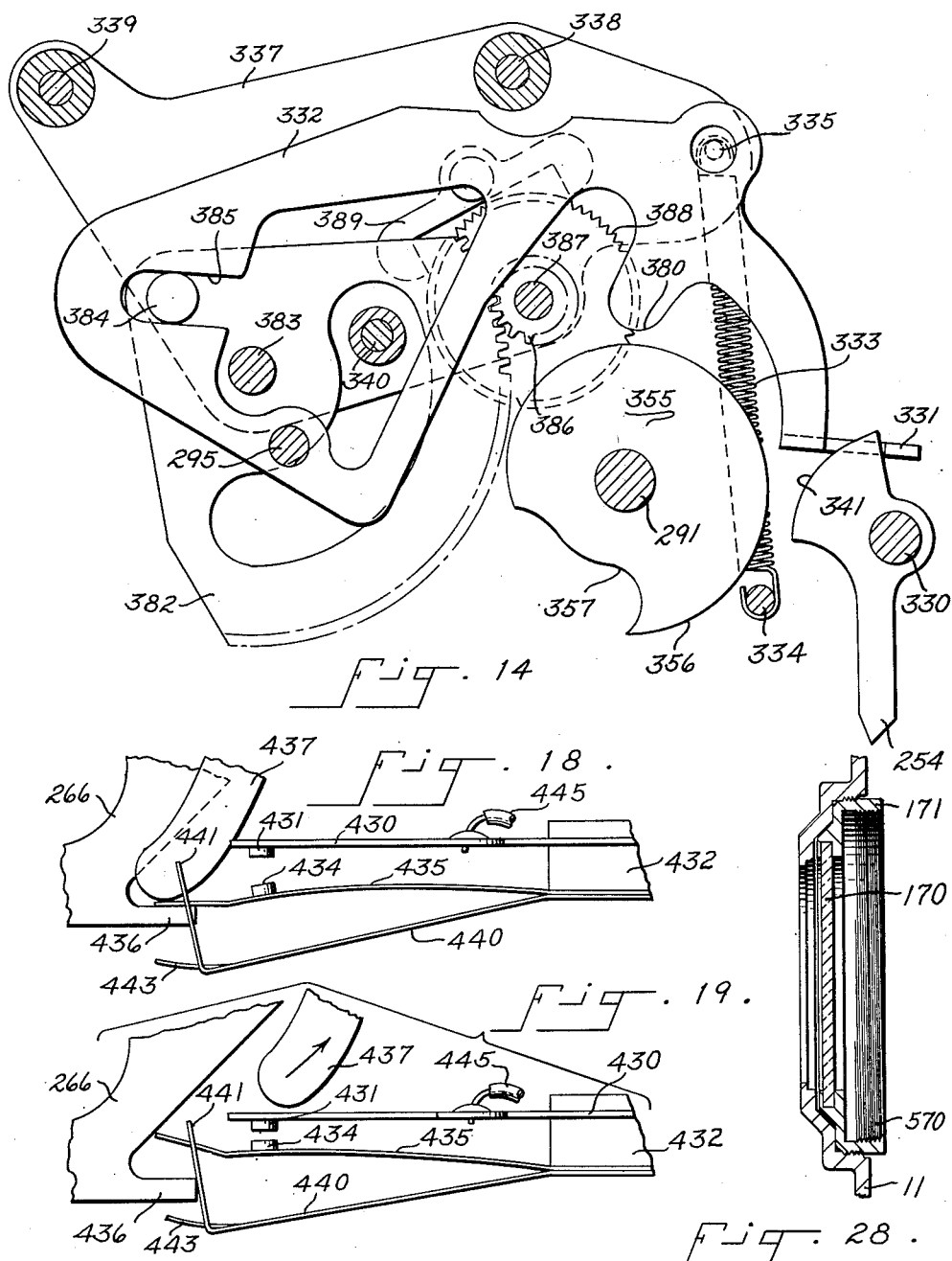

INVENTOR.
Gordon N. Smith
BY Buckhorn and Chatham
Attorneys

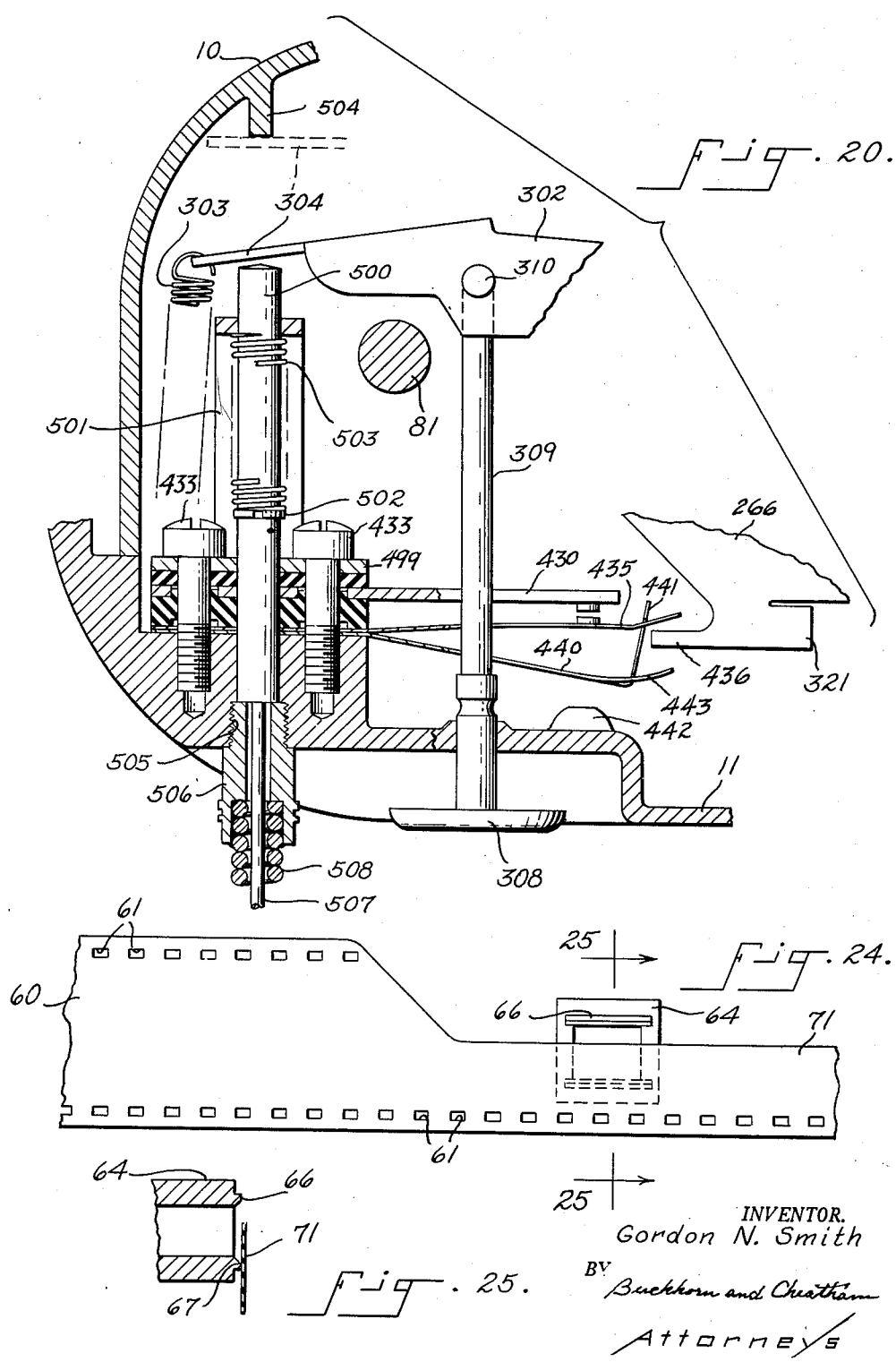

June 8, 1954
G. N. SMITH
2,680,400
STEREOSCOPIC CAMERA
Filed July 3, 1950
10 Sheets-Sheet 10
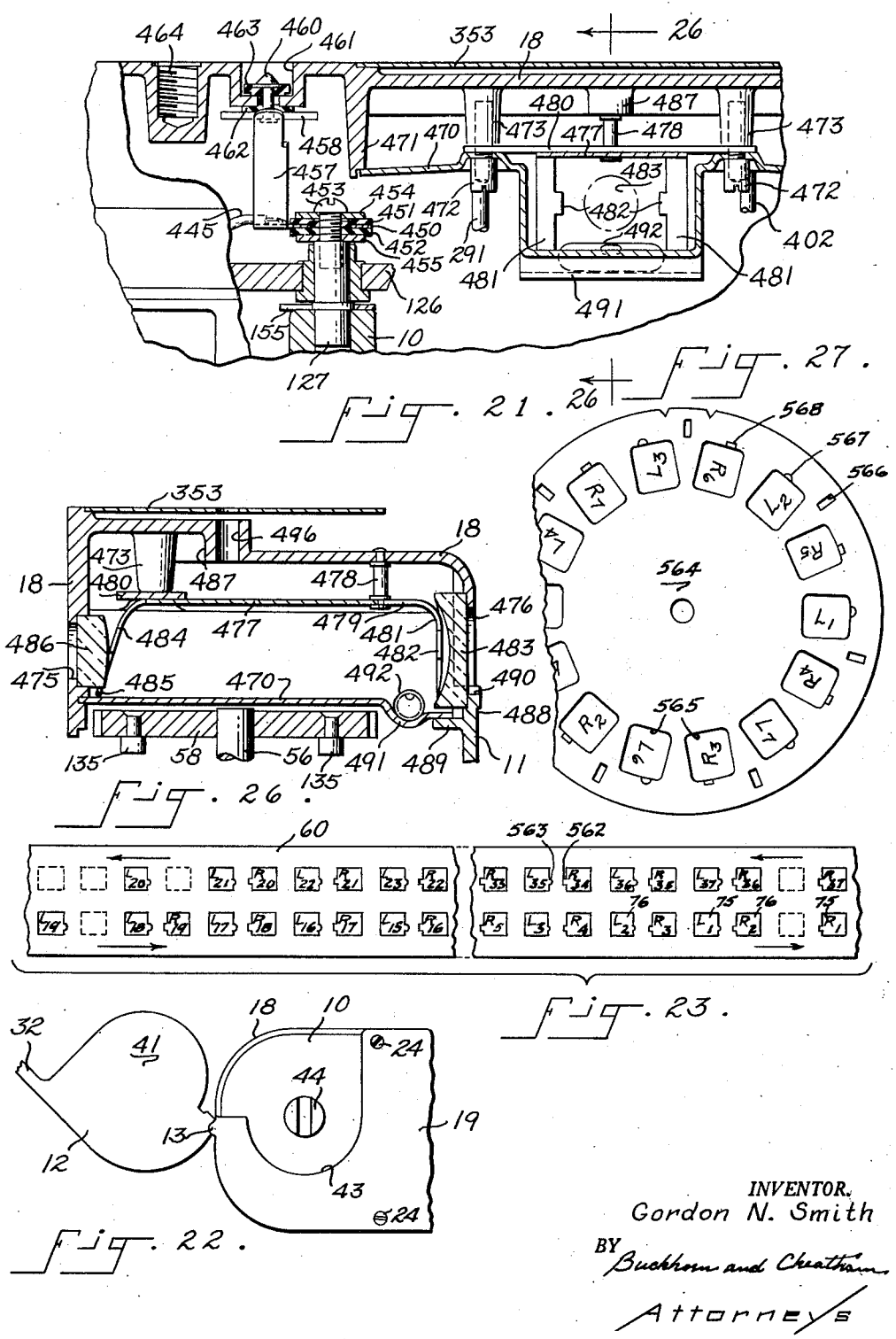
INVENTOR.
Gordon N. Smith
BY
Buckhorn and Cheatham
Attorneys Patented June 8, 1954

2,680,400

UNITED STATES PATENT OFFICE 2,680,400

STEREOSCOPIC CAMERA

Gordon N. Smith, Portland, Oreg., assignor to Sawyer's Inc., Progress, Oreg., a corporation of Oregon Application July 3, 1950, Serial No. 171,863

18 Claims. (Cl. 95—18)

My present invention relates to stereoscopic cameras and to certain improvements in camera mechanisms, particularly relating to stereoscopic cameras but in most instances being applicable to conventional cameras for taking single exposures.

The principal object of the present invention is to provide a camera capable of producing stereoscopic transparencies for use in viewing or projecting devices. While not necessarily limited thereto, the invention is particularly adapted for producing stereoscopic pairs of transparencies which may be mounted in discs adapted to be rotated step by step in a stereoscopic viewing device such as disclosed in the patent to Gruber, No. 2,189,285, or to be rotated step by step in a projecting device designed to project enlarged single or paired images on a distant screen. Also, while not necessarily limited thereto, the invention is particularly adapted to produce stereoscopic pairs of transparencies in a film strip of such relative dimensions that each transparency may be surrounded by a marginal portion including an elongated tab at one end whereby the transparencies may be mounted in a pocketed reel such as disclosed and claimed in the copending application of Kurz, Serial No. 23,113, filed April 24, 1948, now Patent No. 2,571,584, issued October 16, 1951, thus enabling the owner of the camera to produce his own reels of transparencies.

A further object of the present invention is to provide a camera which produces exposures in a film strip, the camera being of such character as to produce two rows of exposures longitudinally of one film strip. Correlated with the foregoing object is the object of providing film strip feeding means adapted to feed a strip of film step by step between exposures in one direction while taking the first row of exposures and step by step in the opposite direction while taking the second row of exposures in order that the completely exposed film strip will be rewound into the cartridge in which it was originally contained when completely exposed.

A further object of the present invention correlated with the foregoing is to provide film advancing mechanism capable of moving film in either direction, by the use of one manual knob, while maintaining the film in taut condition between a cartridge and take-up spool regardless of the increasing or decreasing effective diameter of the roll of film on the shaft of the cartridge or the shaft of the take-up spool.

A further object of the present invention correlated with the foregoing is to provide a camera in which the lens barrel assembly and associated light tunnel is movable vertically between positions for taking one row of exposures and the other row of exposures. Correlated with the foregoing is the object of providing a camera including overlapping pressure pads designed to give proper film pressure over the rear ends of the light tunnels regardless of the relative position of the lens assemblies.

A further object of the present invention is to provide means whereby a film may be advanced step by step for any predetermined, variable distance in accordance with the preselected setting of a limit mechanism. In order that films of various lengths may be employed in the same camera, the limit mechanism may be set to prevent further step-by-step movement of the film in the first direction at the end of a predetermined number of feeding steps, and to prevent movement of the film in either direction until shifting of the lenses to the position for taking the second row of exposures has been accomplished. Such shifting simultaneously shifts certain portions of the film advancing mechanism to prohibit further advancing movement in the first direction and permit step-by-step retraction of the film in the second direction.

A further object of the present invention is to provide means in a camera for permitting variable exposures by use of a single pair of shutter blades movable past the lens system in either of the two selectable positions. In combination therewith the present invention provides shiftable means including a selector plate parallel with and adjacent to a pair of shutter blades for permitting the passage of light through the lens systems in either of the two selectable positions thereof.

A further object of the present invention is to provide shutter operating mechanism including a variable shutter release and escapement device for varying the length of time of exposure between maximum and minimum infinitely variable limits of high speed exposures, or to permit "bulb" exposures.

A further object of the present invention is to provide means for synchronizing the action of a flash bulb igniting mechanism with the movement of the shutter blades. Correlated with the foregoing, the present invention comprises means for preventing the accidental ignition of a flash bulb prior to release of the shutter blades.

A further object of the present invention is to provide improved shutter blade timing mechanism in combination with improved shutter blade and timer resetting mechanism.

A further object of the present invention is to provide improved means for effecting the setting of the variable exposure timing mechanism and variably adjustable iris diaphragm mechanism through the provision of a built-in exposure indicating device such as disclosed in my copending application, Serial No. 74,156, filed February 2, 1949, now Patent No. 2,557,478, issued June 19, 1951.

A further object of the present invention is to provide an improved cable connecting means for permitting actuation of the camera through a cable release device.

A further object of the present invention is to provide means for positively shifting a pair of lens barrel assemblies and associated light tunnels from one to another selectable position in unison with each other and to lock the same in the selected positions.

A further object of the present invention is to provide improved means whereby a wide film strip may be provided with a narrow leader extension adapted to be inserted in a slot in a takeup spool without requiring winding of the narrow leader strip past the rear surfaces of the light tunnels prior to closing the camera casing, in order that a rigid loading sequence need not be observed. As a comment on the foregoing, it is to be observed that a rigid loading sequence is desirable in order that a person may avoid attempting to take exposures on the exposed leader strip, but the camera will operate even though this measure should be overlooked.

A further object of the present invention is to provide an improved film cartridge loading arrangement whereby the cartridge engaging and driving spindle remains fixed in position and the cartridge is inserted longitudinally and coaxially of the cartridge engaging and driving spindle, the case of the camera including means for permitting loading of the cartridge through the bottom of the camera when the rear cover is open.

A further object of the present invention is to provide improved film advancing mechanism including a combination of slip and ratchet clutches.

A further object of the present invention is to provide an improved view finder for a camera including a spirit level to assure leveling of the camera while exposures are being taken.

A further object of the present invention is to provide a steresocopic camera having shiftable picture taking mechanism including a pair of lenses, each of which is in alignment with a spaced portion of one of a pair of filter mounts adapted for reception of standard filters.

A further object of the present invention is to provide a camera having a shiftable lens assembly, which may be shifted from one to another position of operation in order to expose spaced portions of a film, in combination with means for mounting a standard filter cap in such relation as to filter the light passing through the lens in either position thereof.

A further object of the present invention is to provide a haze filter and dust seal combination as a normal part of the camera, which part may be easily removed to permit cleaning of the inner surface of the haze filter.

A further object of the present invention is to provide a stereoscopic camera with means for identifying the right and left exposures, and the tops and bottoms of both exposures, such identifying means also serving to orient the exposures for insertion of the stereoscopic pairs in a mount.

Certain aspects of the present invention not herein claimed are variations of apparatus fully disclosed and claimed in my aforesaid Patent No. 2,557,478 and in my copending patent applications, Serial Nos. 754,961 and 754,963, filed June 16, 1947, the former now issued as Patent No. 2,553,015, dated May 15, 1951, and the latter now issued as Patent No. 2,515,272, dated July 18, 1950. Certain portions of the present apparatus relating to photoflash synchronizing means and film feeding means are disclosed and claimed in the copending divisional applications hereof, Serial Nos. 288,594 and 288,595, respectively, both filed May 19, 1952.

The objects and advantages of the present invention may be more fully ascertained by inspection of the following specification taken in connection with the accompanying drawings wherein like numerals refer to like parts throughout, while the features of novelty will be more distinctly pointed out in the appended claims.

In the drawing, Fig. 1 is a front view of a stereoscopic camera made in accordance with the present invention;

Fig. 2 is a plan view of the camera disclosed in Fig. 1;

Fig. 3 is an end view taken from the left end of Fig. 2;

Fig. 4 is an end view taken from the right end of Fig. 2;

Fig. 5 is a partial rear view of the frame illustrating a portion of the film feeding mechanism;

Fig. 6 is a partial view taken substantially along line 6—6 of Fig. 5;

Fig. 7 is a view in elevation of the inside of the hinged rear cover illustrating the pressure pads and film guiding means, the cover being illustrated as it would appear when removed and turned over about its longitudinal axis;

Fig. 8 is a sectional view looking down across the rear cover, the view being taken substantially from the plane of line 8—8 of Fig. 7;

Fig. 9 is a partial view of the inside of the front cover and the portions of the mechanism mounted thereon including a selector plate, a pair of shutters and a flash switch device, the selector plate being in position to permit exposure of the lower row of exposures;

Fig. 10 is a view looking up on the mechanism disclosed in Fig. 9, the view being taken from the direction indicated by the line 10—10 of Fig. 9;

Fig. 11 is a partial view looking at the front of the frame and mechanism mounted thereon including the shiftable lens assemblies, portions of the film advancing mechanism, the shutter reset and latching mechanism and the shutter timing mechanism, the lenses being elevated to take the upper row of exposures, and the shutter mechanisms being cocked;

Fig. 12 is a partial, sectional view looking down substantially along the plane of the line 12—12 of Fig. 11;

Fig. 13 is a partial, sectional view looking down substantially along the line 13—13 of Fig. 11;

Fig. 14 is a sectional view looking down from the plane of the line 14—14 of Fig. 11 and illustrating the timer cam and escapement mechanism on an enlarged scale;

Fig. 18 is a partial view, on an enlarged scale, of the flash synchronizer switch when the shutters are cocked, illustrating the safety feature thereof for preventing accidental discharge of a flash bulb;

Fig. 19 is a view corresponding to Fig. 18 with the parts in the relative positions assumed when the trip has been almost entirely actuated, immediately prior to release of the shutter blades;

Fig. 20 is a horizontal section showing the cable release pin with a release cable attachment associated therewith, the view being taken substantially along line 20—20 of Fig. 1 and being on an enlarged scale;

Fig. 21 is a partial sectional view illustrating the means for associating a flash gun with the camera and the contact connecting the flash gun to the flash switch taken substantially along line 21—21 of Fig. 2 and being on an enlarged scale;

Fig. 22 is a view looking up at the hinged end of the case with the cover opened to sufficient extent to permit the insertion of a cartridge and the association of the film strip leader with the take-up spool;

Fig. 23 is a schematic view of a portion of a film strip illustrating the exposure sequence for stereoscopic pairs;

Fig. 24 is a somewhat schematic view in elevation illustrating a film leader strip of narrow width associated with one of the light tunnels;

Fig. 25 is a vertical section taken substantially along line 25—25 of Fig. 24;

Fig. 26 is a vertical section taken through the view finder and spirit level substantially along line 26—26 of Figs. 2 and 21;

Fig. 27 is a partial view of the back of a pocketed reel formed for reception of transparencies produced by the camera; and Fig. 28 is an enlarged vertical section taken substantially along line 28—28 of Fig. 1.

Figure 15:
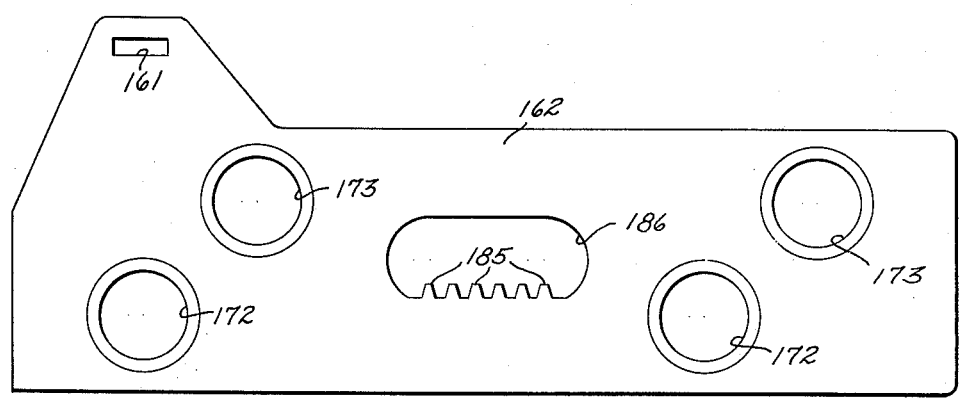
Fig. 15 is a view in elevation of the selector plate alone.

For simplicity each portion of the camera is described under an appropriate subheading.

*Frame and casing*

The camera comprises an interior frame generally designated by the numeral 10. The frame is enclosed within a casing consisting of four separable parts including a front cover 11 which is secured to the frame and a rear cover 12 which is hingedly connected to the front cover and bottom at 13 and held in closed relation thereto by a tongue 14 at the end opposite the hinged end, the tongue having a rectangular opening 15 therein adapted to snap over a rectangular lug 16 on the front cover, the lug being disposed within a rectangular depression 17 to prevent accidental release of the rear cover. When it is desired to load or unload the camera the resilient tongue 14 is released by inserting the fingernail between the bottom of the depression 17 and the tongue 14 whereupon the rear cover may be swung to one side about the hinge 13. The top of the case comprises a part 18 which is secured to the top of the frame, and the bottom of the case is provided by a part 19 which is secured to the bottom of the frame 10. It is to be appreciated that the portions 11, 18 and 19 are detachably secured to the frame in any convenient manner, the means for securing the same being in part relatively inaccessible so as to prevent disassembly of the camera except in the hands of an experienced, trained person. Not all of the attaching means are illustrated, but sufficient are herein illustrated to disclose the principal features thereof. For example, in Fig. 9 there are illustrated a pair of screw receiving bosses 20 adjacent the vertical flange 33 and which are adapted to receive screws passing through an end flange (not illustrated) of the frame 10, the heads of the screws being accessible when the rear cover 12 is swung open. Also, in Fig. 11 a pair of openings 21 are illustrated in an end flange projecting from the opposite end of the frame 10 through which screws pass into threaded screw receiving bosses (not illustrated) in the opposite end of the front cover 11, the heads of the screws therein mounted being accessible when the rear cover 12 is swung open.

The top cover 18 is interlocked with the front cover 11 so as to prevent leakage of light and must be removed before the front cover can be removed even though the screws heretofore mentioned have been removed. The top cover is held in place in part by a pair of screws having their heads engaged beneath pairs of lugs 22 (Fig. 9) projecting inwardly from the front cover 11, and engaged with threaded openings (not shown) in the bottom of the top cover, the screws being accessible by means of long, narrow screw-drivers inserted from the bottom alongside of the shutters after the bottom cover has been removed. The top cover is also held in place in part by screws (not shown) passing downward through the top cover into threaded openings in the frame as indicated at 23 (Fig. 12). Therefore, in order to remove the top cover the bottom cover has to be removed first, the bottom cover being attached by means of screws 24 (Fig. 22) accessible from the outside of the bottom cover, passing through openings therein, and being received in threaded openings 25 in the rear of the frame 10 (Fig. 13) and threaded openings 26 (Fig. 10) in the bottom edge of the front cover, the openings 26 extending into lugs 27 (Fig. 9). It is apparent from the foregoing that even though the bottom cover should be removed it would require expert knowledge completely to remove the casing to expose all of the mechanism.

Light is excluded from the interior of the casing by light-trapping, interfitting flanges on the casing parts and the frame. For the most part description of such interfitting flanges will be omitted, since the provision thereof is standard practice well known in the art. However, it is to be remarked that the frame 10 is preferably provided with a groove 30 (Figs. 5 and 11) in which a flange 31 (Fig. 7) on the hinged rear cover fits, and that the hinged rear cover is also provided with a flange 32 which fits into a groove provided between adjacent edge portions of the frame and of the bottom cover 19 when the bottom cover is in position. The front cover has an inwardly projecting, vertical flange 33 (Figs. 9 and 10) adjacent the lug 16, the outer face of which is beveled in order to engage the inner beveled face of a corresponding flange (not shown) on the free end of the hinged rear cover 12. The hinged end of the rear cover comprises a portion 34 (Fig. 8) which is rolled inwardly to provide a holder for a vertical rod having its ends projecting beyond the cover to provide the pintles 35 and 36 of the hinge 13. The upper pintle 35 is receivable in a socket (not shown)

in the top cover 18 and the lower pintle 36 is receivable in a corresponding socket (not shown) in the bottom cover 19. When the bottom cover is removed the hinged rear cover may be swung open and moved downward to disengage the pintle 35 from its socket. A light shield plate 38 is mounted adjacent the pintle-retaining portion 34, the two being held together by rivets 39, the enlarged heads of which project into the cartridge receiving space to form a spaced pair of locating pads to prevent the cartridge from more than a limited amount of relative freedom in the cartridge receiving space. The end of member 38 adjacent the pintle is spaced from the portion 34 to provide a vertical groove 40 into which a flange on the adjacent end of the front cover (not shown) projects when the rear cover is swung shut. The flange 32 is of relatively narrow width across the rear of the camera, but adjacent the hinged end the flange is enlarged to provide a cartridge supporting shelf 41 which fits into a continuation of the groove between the bottom cover and the bottom edge of the frame when the rear cover is swung shut in order that a cartridge, indicated in schematic outline in Fig. 8, may be supported in the cartridge receiving space 42 (Figs. 5 and 13) in the frame 10, the upper end and inner surface of the cartridge receiving space being formed in the frame itself. The bottom cover is provided with a large open notch 43 (Figs. 3 and 22) forming a continuation of the cartridge space whereby a cartridge may be inserted longitudinally from the bottom of the camera when the rear cover is swung open. The upper end of the cartridge is thus moved longitudinally into engagement with the cartridge engaging and driving spindle 44 (Figs. 5 and 6) which is provided with a forked lower end in accordance with usual practice. After the cartridge is inserted, and prior to closing of the hinged rear cover, the film leader strip is stretched across the rear of the frame 10 and the tip thereof is hooked into a vertical slot 45 (Fig. 5) in the outer shell 46 of a take-up spool journaled in a take-up spool space 47 at the opposite end of the frame. The shell 46 is pressed onto an enlarged diameter of a hub portion 48 which may be manually rotated as will appear so that the film may be wound onto the take-up spool or released therefrom in accordance with the manipulation of a film advancing knob 50. In either direction of movement the film is guided between an upper flange 51 and a lower flange 52 on the frame 10, movement of the film being effected by a spaced pair of sprockets 53 fixed to a sprocket hub 54 and retained in a sprocket recess 55 in the frame 10. The hub 54 is fixed to a vertical shaft 56 by means of setscrews 57, the shaft projecting through the top of the frame and being fixed to a horizontal, sprocket shaft driving gear 58. When the film strip has been firmly engaged the rear cover may be closed.

*Picture sequence*

As indicated more or less schematically in Figs. 23, 24 and 25, the present invention is designed for use with 35 mm. film strip, the film strip 60 having upper and lower perforations 61 therein for engagement with the sprockets 53 and the clear space between the perforations being such that a lower row of approximately 16 mm. exposures may be taken, followed by an upper row of approximately 16 mm. exposures, with clear space between the exposures and between the upper and lower rows so that each exposure may have a margin surrounding the same when cut from the film strip to permit insertion of the views in a holding reel such as disclosed in the above-mentioned Kurz patent. In order that the upper and lower rows of exposures may be taken, the frame is provided with a spaced pair of light tunnel clearance holes 63 (Fig. 5), one at each side of the sprocket recess, and a spaced pair of light tunnels 64 are guided by guide posts 210 and 213, and guide posts 139 and 217, respectively, in the clearance holes for movement between upper and lower extreme positions. Each of the light tunnels is provided with an upper, inwardly beveled rail 66 (Fig. 25) and a lower, inwardly beveled rail 67, both rails projecting a few thousandths of an inch beyond the vertical faces of the frame 10 so that the film surface rides on the accurately machined outer edges of the rails, thus locating the film in exact relation to the lenses 70.

It will be noted that the open space surrounding hub 48 (Fig. 5) inside of the shell 46 on the take-up spool is of lesser height than the distance between the guiding flanges 51 and 52 but is sufficiently high to provide a slot 65 long enough to accept the relatively narrow film leader 71 (Fig. 24). The beveled inner edges of the rails 66 and 67 (Fig. 25) are provided to prevent the light tunnel rails from catching the edges of the film leader strip when the light tunnels are shifted over the narrow film with the camera back closed. This provision eliminates the necessity for a rigid loading sequence. After the rear cover has been closed and the entire fogged leader portion of the film has been wound past the second light tunnel, the camera may be operated to expose spaced pairs of stereoscopic transparencies as follows.

The centers of the lenses and light tunnels are spaced apart by the average interpupillary distance of about 65 mm. so that upon the first exposure a pair of stereoscopic transparencies 75 will be produced as seen in Fig. 23, Fig. 23 being a view looking at the back of the film when the film is in the camera. It will be seen that between the right and left exposures there is sufficient room for two more exposures to be taken, but the advancement of the film is such that each movement advances the film two-thirds of the distance between the centers of the left and right exposures so that the second exposure produces a stereoscopic pair indicated by the numerals 76, there being an unexposed blank between the right exposures of the first and second pairs. The third exposure will, however, occur in such position that none but the second space is wasted. The sequence of transparencies is as follows: Right 1, blank, Right 2, Left 1, Right 3, Left 2, Right 4, and so on. When the proper amount of film has been fed onto the take-up spool, the feeding direction is reversed, the light tunnels raised into position to take the upper row of exposures, and the film rewound onto the cartridge. At the end of this return movement there will be one blank space, as indicated in Fig. 23, between R36 and R37.

Film of the character described is usually supplied in cartridges containing sufficient film for twenty 35 mm. frames, and will provide twenty pairs of approximately 16 mm. exposures in each of the upper and lower rows, or in cartridges containing sufficient film for thirty-six 35 mm. frames, which will provide thirty-six pairs of approximately 16 mm. exposures in each of the upper and lower rows. The film advancing knob 50 (Fig. 2) is provided with a corresponding plurality of indicia movable past a fixed pointer 80 on the top of the camera. In order to prevent unwinding of the entire length of film from the cartridge, the film advancing knob may be set at a selected position prior to taking the first exposure as follows:

The hub 48 (Figs. 5 and 6) is loosely journaled upon a central shaft 81 which extends beyond the shell 46 at its upper and lower ends, the lower end being journaled in a socket (not shown) in the bottom cover 19 and the upper end projecting through the top cover 18. The shaft 81 is loosely journaled within the hub 48 so that it may be moved longitudinally or rotationally, and the knob 50 is fixed to the shaft by a setscrew 84 (Fig. 1) so as to rest upon the upper end of a collar 85 fixed to shaft 81 and slidably and rotationally journaled in a bearing in the upper cover 18. The knob is normally maintained against the upper cover by a curved washer spring 86 surrounding the collar 85 and bearing against the lower surface of the upper cover. The spring 86 bears against a film advance stop 90 fixed to the upper surface of a clutch pinion 91 pressed onto the shaft 81. When the knob 50 is pulled by a force stronger than the pressure of the spring 86, the pinion 91 is slid out of engagement with the teeth of an idler gear 92 loosely journaled on a stub shaft 93 projecting upwardly from the frame. The idler gear 92 is provided with an oppositely disposed pair of upwardly projecting abutment pins 94 which normally rest in alignment with the centers of the sprocket gear shaft 56 and the take-up spool shaft 81 (Fig. 6). When the pinion 91 is elevated by pulling knob 50 upward, the portion of the stop 90 which might engage one or the other of the pins 94 may be rotated above the tops of the pins so that the take-up knob 50 may be freely rotated to any selected position.

As seen in Fig. 2, the indicia on knob 50 include three boldly indicated indicia numbers, namely 1, 19 and 35, the numeral 1 being directly over the tip of stop 90. When a twenty-exposure-35 mm. film is used, the exposed leader portion is first wound onto the take-up spool by advancing the film strip three times in the manner to be explained; then the knob 50 is elevated and rotated to bring the numeral 19 opposite the indicator 80. Similarly, when a thirty-six-exposure film is used, the numeral 35 is placed opposite the indicator 80. The advancing movement between frames is accomplished by manual rotation of the knob 50 which drives the sprocket gear 58 a half revolution through pinion 91 and idler gear 92. The gears 58 and 92 are provided with eighty teeth and the pinion 91 is provided with one more than half that number, or forty-one teeth, so that stop 90 moves back one tooth toward pin-engaging position during each feeding movement. When nineteen or thirty-five exposures have been made, as the case may be, the numeral 1 comes back to the indicator 80 at the same time that the stop 90 arrives in such position as to prevent further winding of the film onto the take-up spool due to the engagement of the stop with one or the other of the abutment pins 94. The operator then knows that he must shift the light tunnels to the upper position and thereafter rotate the knob 50 in the opposite direction until the numeral 19 or 35 reaches the indicator again in the reverse direction.

Fig. 23 discloses the picture sequence on a twenty-exposure-35 mm. film strip, it being apparent from examining the right and left exponents that thirty-seven exposures may be made, nineteen in the lower row and eighteen in the upper row. As previously explained, there will be a blank between Right 1 and Right 2, and it will likewise be apparent that there will be a blank between Left 18 and Left 19 since the stop 90 engages the abutment pin 94 at this point to prevent further advancement of the film in the initial direction. The operator must now elevate the light tunnels and start turning the knob 50 in the opposite direction as indicated by the arrows. Since the film advancing and shutter resetting mechanism are tied together, as will presently appear, no exposures can be taken in the spaces immediately above Right 19 and Left 19, since the film must be advanced in order to reset the shutters after having taken the nineteenth pair of exposures. Accordingly, the twentieth pair of exposures will occur above the eighteenth pair of exposures, then the next advancing movement will cause another blank space to be left since the twenty-first pair of exposures will be above the seventeenth. A careful operator will observe the fact that the index numeral 19 on knob 50 will be opposite the pointer 80 when he takes the thirty-seventh pair of exposures, and will thereafter successively advance film and release the shutters without attempting to take further pictures since the exposed leader portion will now be behind the lenses, thus leaving a blank above the first blank which initially occurred between Right 1 and Right 2. Altogether, on a twenty-exposure-35 mm. film strip there will be six blanks, as clearly shown in Fig. 23. Likewise, in a thirty-six-exposure-35 mm. film strip there will be the same number of blanks and there will be thirty-five pairs of exposures in the lower row and thirty-four pairs of exposures in the upper row.

It is to be appreciated that the knob 50 may be set at any initial position so that if an operator wishes to take eight pairs of exposures, for example, he may set the eighth division on knob 50 opposite the pointer 80 when taking the initial exposure and the stop 90 will come back to one of the abutment pins 94 when the eighth pair is exposed, thus reminding the operator that he has taken the number of exposures he wished to take and to shift the light tunnels and wind film in the opposite direction. Likewise, it is not necessary to continue winding film in the first direction until the entire strip has been exposed even though the knob 50 has been initially set for such, as reversing movement may be accomplished at any time upon shifting the winding mechanism.

When the film is to be wound out of the cartridge to take the lower row of exposures means are provided to prevent winding of the film in the reverse direction, as will appear, and vice versa.

*Film advancing mechanism*

The knob 50 is rotated counterclockwise (Fig. 6) to advance the film strip from the cartridge. Rotation of the take-up spool is achieved through the medium of a spool driving pinion 100 (Fig. 5) which constantly meshes with the idler gear 92, the pinion 100 having the same number of teeth as the clutch pinion 91 so that at each half revolution of the sprocket driving gear 58 and the sprockets 53 the take-up spool makes slightly less than one revolution, provided it rotates coextensively with the pinion 100. Positive metering of the film is achieved through the sprockets 53 which are rotated exactly one-half of a revolution at each feeding movement, limitation thereof to one-half of a revolution being achieved through means to be described later. The effective diameter of the take-up spool is such that when it is practically empty one revolution will wind up slightly more film than the amount fed forward by the sprockets 53. Therefore, means must be provided to permit the take-up spool to rotate to a lesser extent than the driving pinion 100 in varying degrees as the size of the roll of film upon the shell 46 increases, the means being described as follows: The hub 48 of the take-up spool is provided with several steps of increasing diameter, the face of the upper one supporting the pinion 100. The pinion 100 is loosely journaled upon shaft 81 for relative rotational movement with respect to a disc 101 fixed to the upper one of these steps. On the next lower step of the hub 48 there are loosely journaled a friction pad 109 and a pawl mounting plate 102 which is held in friction contact with the friction pad by a spring washer 103 bearing against the lowest step. The plate 102 has an upwardly extending, curved arm 104 thereon which anchors one end of a spring 106, the other end of the spring engaging the free end of a dog 107 pivotally mounted on a pin 108 rising from the plate 102. Spring 106 urges dog 107 into engagement with the teeth of the pinion 100 in such manner as to permit clockwise rotation of the pinion 100 independently of the plate 102, but counterclockwise rotation of the pinion 100 results in corresponding movement of the plate 102. When the plate 102 is driven counterclockwise the take-up spool will be urged by friction washer 109 to rotate in the direction to wind film thereonto as it is fed forward by the sprockets 53. Since the take-up spool normally tries to wind up more film than is paid out by the sprockets, the friction clutch arrangement provided by the disc 101, friction pad 109, plate 102 and spring washer 103 permits the take-up spool to slip while the film is constantly maintained in taut condition between the take-up spool and the sprockets.

When the lenses are shifted to the upper position and the film is being wound in the reverse direction by rotating the clutch pinion 91 clockwise, the spool pinion 100 will also rotate in the clockwise direction since it is connected thereto through the teeth of the idler gear 92, but the dog 107 will ride over the teeth of pinion 100 and the plate 102 will rotate more slowly with the take-up spool as it is pulled in the reverse direction by the sprockets 53. The dog and friction clutch prevent the take-up spool from being rotated due to the film trying to straighten itself.

The cartridge engaging spindle 44 is loosely journaled in a sleeve 110 having an annular head 111 thereon which is provided with a step on its upper surface loosely journaling a second pawl mounting plate 112, this plate being similar to plate 102 but mounted in the reverse direction so that a spring mounting arm portion 113 extends downwardly to anchor one end of a pawl spring 114 which is engaged with a dog 115 pivotally mounted on a pin 116 depending from the plate 112. A friction washer 117 is pressed against the upper surface of plate 112 by a spring washer 118 held in position by a pin 119 extending transversely through a hole in the spindle 44 and resting in a slot 120 in the spring washer so that the washer must rotate when the spindle 44 is rotated. The sleeve 110 loosely journals a spindle pinion 125 which constantly meshes with a second idler gear 126 loosely journaled upon a stub shaft 127 extending upwardly from the frame. The gear 126 is provided with eighty teeth, the same number as gears 58 and 92, and the pinion 125 is provided with one more than half that number, or forty-one, teeth as is the case with pinions 91 and 100.

When the knob 56 is rotated counterclockwise to wind onto the take-up spool film which is being advanced by the sprockets 53, the chain of gears provided across the top of the frame likewise rotates the pinion 125 in the counterclockwise direction, the pinion revolving slightly less than a complete revolution at each semi-revolution of the sprockets 53. Rotation of the spindle 44, however, is solely accomplished by the sprockets 53 drawing the film from the cartridge as the dog 115 rides over the teeth of pinion 125, to the least extent when the cartridge is full and to a progressively increasing extent as the cartridge empties. The dog and the friction disc 117 prevent excess unwinding.

When the lenses and light tunnels have been elevated and the film is to be wound back into the cartridge, the knob 56 is turned clockwise so that the pinion 125 and spindle 44 are driven clockwise in the direction to wind film into the cartridge. The dog acts positively to drive the plate 112 in the clockwise direction to the same extent that the pinion is driven but the friction clutch permits the spindle 44 to slip to an increasingly greater extent as the diameter of the roll of film in the cartridge progressively increases.

*Film metering and direction of advance control*

Means are provided directly beneath the gear 58 and the idler gears 92 and 126 whereby rotation in either direction is limited to one-half of a revolution of the sprockets 53 and whereby the film may be drawn out of the cartridge only when the lenses are down and wound back into the cartridge only when the lenses are up. As will be seen in Fig. 12, the sprocket gear shaft 56 extends through one end of a pair of longitudinal slots 130 in a superimposed pair of longitudinally movable limiting slides 131, the opposite ends of the slots 130 being guided by the idler gear shaft 93 (Figs. 11 and 12). The ends of the slides 131 adjacent shaft 93 rest upon a shoulder 132 on the shaft and may cant thereabout in the longitudinal direction depending upon the extent to which a spring 133 surrounding shaft 56 is compressed, the spring 133 normally maintaining laterally and upwardly extending wings 134, one on each of the slides 131, up against the lower surface of the sprocket gear 58. Each of the wings 134 is successively engaged by one or the other of a pair of stop pins 135 projecting downwardly from gear 58, the pins being diametrically opposed to each other. Each slide is provided with a lateral arm 136 which is engaged by one end of a spring 137 extending toward the take-up spool end of the frame, the springs being anchored, one to a lug 138 at the back of the frame and one to the upper end of a long light tunnel guide 139 mounted in the front of the frame, the springs tending to retain the slides in superimposed relation with the ends of the slots 130 against the shaft 56 as illustrated in Fig. 12. In order that the spring 133 may operate without interference, it bears against a flange 140 on a sleeve 141 surrounding shaft 56, the flange being in contact with the lower slide.

The sides of the slots 130 are outwardly notched as indicated at 144 and 145, the notches being of sufficient size to permit partial rotation of a slide lock 146 on the upper end of a slide locking shaft 147, the slide lock being movable from the position illustrated in full line in Fig. 12 to the position illustrated in dash line in the same figure. When the lock is partially rotated out of longitudinal alignment with the gear train shafts so as to engage the shoulders provided by the notches 144 as shown in full line, the slides are both locked against longitudinal movement and the gear train is likewise locked since both of the stops 135 are in engagement with the wings 134 on the slides. The lock 146 is rotated to the locking position when a film advancing movement is being made and the shutters are being cocked, as will be explained later.

When the shutters are tripped to take an exposure the lock 146 is automatically rotated into alignment with the gear shafts as shown in dash lines, thus permitting longitudinal movement of the slides to the extent that the slots 130 extend beyond stub shaft 93 as seen in Fig. 12. Such longitudinal movement occurs when the knob 50 is rotated, whereupon the gear 58 moves either one of the slides through the stop 135 engaging wing 134. It will be apparent that the stop 135 will pass beyond the tip of the driven wing 134 when the gear 58 has rotated about twenty degrees, whereupon the slide 131 which has been moved from its normal position is snapped back by the spring 137 into position to engage the opposite stop 135 when it has completed half a revolution. At a portion of a revolution of gear 58 beyond this point the shutter and timer resetting mechanism causes lock 146 to move back to locking position so that rotation of gear 58 will be limited to one-half a revolution. The stop 135 which has moved one of the slides must pass over the wing 134 of the other slide in order to permit completion of the half revolution, and for this purpose each slide wing is bent upwardly to provide a ramp for the bottom of stop 135 which cams the side wing 134 downwardly as permitted by the spring 133, the wing 134 snapping up behind the stop as soon as the half revolution is completed. The slides are now locked between the lock 146 and the shaft 56 so that rotation of shaft 56 in either direction is prevented.

In order that film may be drawn out of the cartridge only when the lenses are down and wound into the cartridge only when the lenses are up, a shift lock plate 155 (Figs. 11 and 12) is pivotally mounted upon an enlarged lower shoulder of the stub shaft 127 on which the idler gear 126 is mounted, the gear having a large lower hub to retain the plate. The shift lock plate 155 is provided with a pair of stop fingers 156 which straddle a lug 157 on the frame 10. When one of the fingers bears against one side of the lug a vertical flange 158 on the shift lock plate is aligned with the end of one of the slides 131 as seen in full line in Fig. 12, and when the other finger bears against the opposite side of the lug the flange 158 is aligned with the end of the other slide 131 as seen in dash line in Fig. 12. The plate supports one end of a shift lock plate spring arm 160, made of spring wire, which extends forward beyond the frame 10 and engages in a rectangular notch 161 in an upwardly extending portion of a selector plate 162 (Figs. 9 and 15). The selector plate is movable longitudinally from one extreme position illustrated in full line in Fig. 9, when the lower row of pictures is to be taken, to the opposite extreme position illustrated in dash line in Fig. 9, when the upper row of pictures is to be taken. The spring arm 160 engages one or the other end of the slot 161 when the selector plate is being shifted to shift and hold the flange 158 in the desired position. Thus, when film is to be unwound from the spool, one of the slides 131 is blocked, preventing the gear 58 from being turned in the wrong direction so that the knob 50 may be turned only in the counterclockwise direction (Fig. 6). When the lenses are shifted upwardly and the selector plate moved to the opposite extreme position the other slide is blocked and the knob may only be turned in the clockwise direction for rewinding the film into the cartridge while the upper row of pictures is being taken.

*Selector plate and lens shift*

The selector plate 162 mentioned above is a thin sheet metal plate stretching across the front of the camera behind a pair of large windows 170 (Fig. 1), the centers of which are spaced apart approximately the average interpupillary distance of 65 mm., the windows being closed by optically clear glass mounted in slightly projecting window frames 171, the rims of which are threaded for mounting filter retainers (Fig. 28). The selector plate (Fig. 15) is provided with a lower pair of apertures 172 in horizontal alignment and spaced the same distance as the windows 170, the apertures being of sufficient size to permit the maximum amount of light through similarly spaced lenses 70 when aligned therewith while the lower row of pictures is being taken. The selector plate is also provided with an upper, horizontally aligned, offset, pair of apertures 173 spaced apart by the same amount for registry with the lenses when in the upper position. The selector plate is longitudinally guided by turned steps on a pair of studs 174 (Fig. 9) guiding the upper edge thereof and by turned steps on a pair of studs 178 (Fig. 10) guiding the lower edge thereof, the upper edge of the plate being retained between the step shoulders 176 of the studs 174 and a selector plate retainer strip 177 mounted on the studs 174. The lower edge of the selector plate is retained between the step shoulders of the shutter studs 178 and a lower selector plate retainer strip 180, held in place by screws 175, so that the selector plate may be moved longitudinally from a position such that one or the other pair of apertures therethrough is in alignment with the lenses.

Movement of the selector plate is effected through a selector knob 181 on the front of the camera between the windows 170, the knob being provided with appropriate directional arrows and indicia to indicate the direction of rotation of the knob to shift the lenses. The knob is fixed to the end of a shaft 182 which extends through and is journaled in the front cover 11. Milled in the shaft is a selector plate shifting pinion 183, the teeth of which are engaged with rack teeth 185 on the lower edge of an elongated slot 186 in the central portion of the selector plate, whereby as the knob 181 is rotated 180 degrees the pinion and rack longitudinally shift the selector plate. A partial cap 187 covers the lower portion of the front of the knob 181 so that one or the other of the pair of directional arrows thereon will be hidden in order that the operator will be saved confusion and may tell at a glance which direction the knob may be rotated.

The inner end of shaft 182 is fixed to a lens shifting lever 190 having a crank pin 191 thereon which extends into a slot 192 (Fig. 11) in a lens shifting yoke 193 extending horizontally across the front of the frame. The opposite ends of the yoke 193 are provided with forks which embrace pins 194 on the adjacent edges of the light tunnels 64, the pins projecting forwardly from lugs on the adjacent forward edges of the tunnels. Each of the pins 194 is also engaged in the outer forked end of an arm of a lens shifting sector gear 195, the gears being pivoted on fixed bosses 196 of the frame 10, the inner adjacent ends of these arms being provided with gear teeth whereby movement of the pins 194 in unison in a vertical direction is assured. A coaxial extension 200 of shaft 182 projects forwardly in position to engage in a journal opening 201 in a plate 202 overlying the meshed sector gears and the shifting yoke and mounted on the frame by a pair of screws 203, so that the inner end of the shaft 182 is rigidly maintained against play. The crank 191 moves about the curved outer edge 205 of the plate 202 as the crank arm 190 is rotated through 180 degrees.

One of the light tunnels 64 is provided with a forwardly projecting guide fork 209 which is fixed to its lower surface and projects laterally to embrace a short guide post 210 mounted in lugs extending from the front wall of the portion of the frame defining the cartridge receiving space and retained by screw 211. The inner end of the opposite side of the light tunnel 64 is provided with a pair of laterally projecting guide sleeves 212 which embrace vertically spaced portions of a long guide post 213 mounted in the frame 10 and retained by screw 214 (Fig. 12). The opposite side of the other light tunnel is provided with a forwardly and laterally projecting guide fork 215 at its upper front corner which embraces the upper part of the guide post 139 to which the spring 137 is attached as previously noted. The opposite rear corners of this light tunnel are provided with a pair of guide sleeves 216 which project laterally and embrace a guide post 217 fixed in the frame 10. Each of the light tunnels is therefore guided on diagonally positioned, vertical posts, each guide tunnel having two portions totally embracing one of the posts and a third diagonally positioned guiding portion partially embracing the other post. This effects a three-point guiding means for precise, easily machined and easily aligned assemblies. Each of the light tunnels is provided with a pair of oppositely projecting upper and lower limiting screws 218 which may be adjusted to engage portions of the frame 10 to limit vertical movement of the light tunnels in either direction so as to align them optically with the film exposure areas, thereby properly fixing the positions of the rows of exposures with respect to the edges of the film as it is being guided between the flanges 51 and 52 on the frame 10.

The end of the slot 192 in shifting yoke 193 in vertical alignment with the journal opening 201 is provided with a pair of vertically extending upper and lower detent notches 220 into which the crank pin 191 snaps at the limit of its movement, thereby frictionally locking the light tunnels against accidental displacement from correct positions for taking the two rows of pictures. The yoke 193 is made sufficiently resilient to bow vertically as the crank pin 191 attempts to move the tunnels to a greater extent than permitted by screws 218. Considerable force is required to spring the yoke arm 193 as pin 191 leaves the detent notches 220.

*Shutters and shutter reset mechanism*

Figure 16:
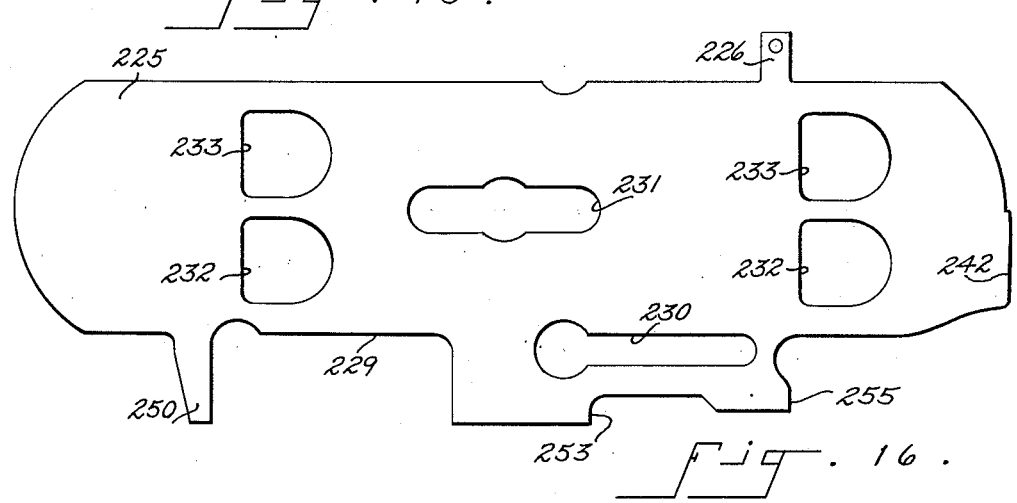
Fig. 16 is a view in elevation of the inner shutter alone when the inner shutter is released, the selector plate and inner shutter being in vertical alignment corresponding to the superimposition thereof illustrated in Fig. 9.
Figure 17:
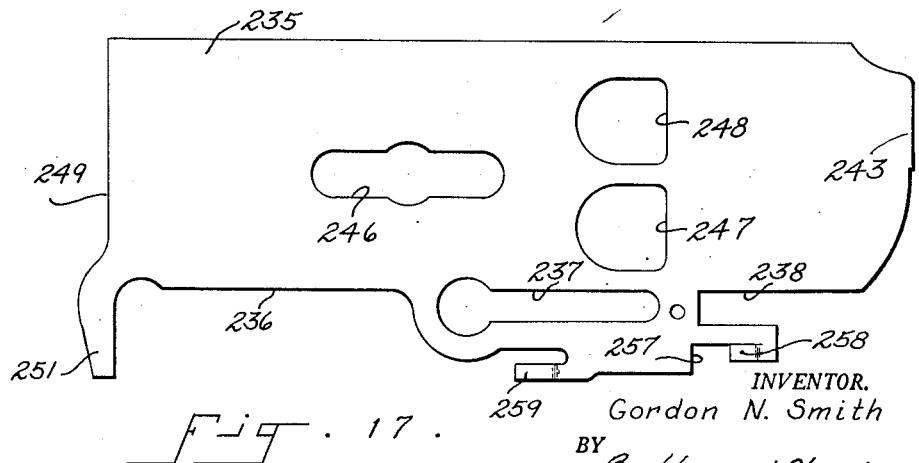
Fig. 17 is a view in elevation of the outer shutter alone in the released position corresponding to Fig. 9.

The shutters are partially disclosed in Figs. 9 and 10 in superimposed relation in released position, and are shown alone in Figs. 16 and 17, offset vertically from each other in the same relative positions occupied in Fig. 9 and in the same relative position with respect to the selector plate 162 illustrated in Fig. 15. The shutters comprise a rear shutter 225 having for the most part a straight upper edge broken only by a spring anchoring tab 226 to which one end of a shutter actuating spring 227 is fixed, the other end of the spring being anchored to a pin 228 at the end of the front cover 11. The longitudinally straight upper edge of the shutter is guided in guide grooves in the studs 174, which are similar to guide grooves in studs 178 fully illustrated in Fig. 10. One of the lower studs 178 guides a lower longitudinal edge portion 229 of the rear shutter and the other stud 178 fits a slot 230 in the lower portion of the rear shutter. The shaft 182 of the selector plate shifting mechanism passes through a central horizontal slot 231 so that the rear shutter may slide longitudinally from its cocked or set position to the released position as urged by the spring 227. The rear shutter is provided with a horizontally spaced pair of lower apertures 232 having rounded right ends and squared left ends, and an upper pair of apertures 233 of identical shape in vertical alignment therewith. When the rear shutter is cocked the rounded right edges of the apertures register with the selector plate openings 172 or 173, depending upon the position of the selector plate.

The front shutter 235 rests in face-to-face relation with the rear shutter in the guiding grooves previously described, the straight upper edge being in engagement with both upper guides and the lower edge being provided with a straight portion 236 for engagement with one lower guide and a slot 237 for engagement with the other lower guide. The front shutter is provided with a longitudinally extending notch 239 near its lower right end into which extends the lower actuating spring 240, the opposite end of which is connected to a pin 241 on the cover 11.

The shutters are made of thin spring steel and weigh substantially the same amount, and the springs 227 and 240 are of substantially equal strength, so that when the shutters are released they will move across the camera at substantially the same speed. The rear shutter is provided with a nose portion 242 along its lower half and the front shutter is provided with a nose portion 243 along its upper half, the edges thereof being engageable with a fiber strip 244 mounted at its ends in supports on the cover 11 so as to be capable of springing slightly to cushion the shock of arresting the shutters at the limit of their travel. The nose portion 243 strikes the upper end of the arresting strip 244, and nose portion 242 strikes the lower end of the strip so as to minimize rebound of both shutters.

The front shutter is provided with a slot 246 through which the selector plate shifting shaft extends, and is provided with a single pair of vertically aligned apertures 247 and 248 similar to the apertures 232 and 233 but reversed so as to have squared ends at the right and rounded ends at the left. The distance between the left edges of each pair of openings 232 or 233 is the same as the distance between the right edges of the openings 247 and 248 and the vertical left edge 249 of the front shutter. When the shutters are in released position the vertical edges of apertures 247 and 248 and the edge 249 of the front shutter are at the right of the selector plate apertures 172, as seen in Fig. 9, and all of the apertures in the rear shutter are well beyond the apertures 172 and in approximate alignment with the apertures 173. When the shutters are in cocked position the vertical left edges of apertures 232 and 233 are at the left sides of the apertures 172 and solid portions of the front shutter block the passage of light therethrough.

The shutters are supplied with resetting lugs, 250 and 251 respectively, which are relatively superimposed when the shutters are in released position and when the shutters are in cocked position, the lugs being engageable by a resetting finger 252 (see Fig. 13) on a resetting lever, to be described, whereby the shutters may be moved from released to cocked position upon each film advance. The rear shutter is provided with a vertically extending, secondary latch engaging, vertical edge 253 which is engageable with a secondary shutter latch 254 capable of holding the rear shutter in set position independently of the front shutter. The rear shutter is also provided with a spaced, vertical edge 255 which is engageable with a primary shutter latch 256. The front shutter is provided with a single, vertical, primary latch engaging edge 257 which is aligned with the edge 255 when the shutters are released as seen in Fig. 9, or cocked as seen in Fig. 13, so that both shutters may be held in cocked position by the primary shutter latch 256. The primary shutter latch 256 is released to initiate an exposure and, since the front shutter is held solely thereby, the front shutter will speed across the front of the camera and come to rest with its apertures in alignment with the windows 170. At a time interval subsequent thereto the secondary shutter latch 254 is released so that the rear shutter will speed across the front of the camera and come to rest with its apertures out of line with the windows 170. The time interval between release of the front and rear shutters determines the exposure time during which light passes through the windows, both shutter blade apertures and lenses. For "bulb" exposures the front shutter is released and comes to rest, in which case the aperture 247 or 248 is opposite one of the lenses and the straight edge 249 has cleared the other lens. The rear shutter is held in cocked position with the apertures 232 and 233 in alignment with the lenses so that light may pass through the unrestricted apertures until the desired time has elapsed, whereupon the secondary shutter latch 254 is released to permit the rear shutter to travel to released position, thereby blocking the passage of light to the lenses. When the shutters are reset they travel together in the same relationship illustrated in Fig. 9 and remain in the same relationship in set position so that light is blocked until the next exposure is desired. This structure is essentially the same as that illustrated and claimed in my aforesaid copending application, Serial No. 754,961, now Patent No. 2,553,051.

Both of the shutter latches 254 and 256 are provided with sharply beveled, pointed ends so that when the shutters are released and swing the latches back the pointed ends will be in position to engage a pair of tongues 258 and 259 which project from the front shutter beyond the rear shutter in spaced relationship to the latch engaging edges 255 and 253 thereon. When the resetting lever is actuated to move the shutters from released to cocked position the tongues force the shutter latches to swing about their pivots, thereby causing the latches to return to their holding positions.

The shutter resetting finger 252 comprises an extension of a resetting lever 265 (Figs 11 and 13). The resetting lever 265 is supported upon a timer and resetting mechanism mounting plate 266 which extends horizontally across the lower portion of the frame in a space provided beneath the bottom of the light tunnel clearance holes 63, the plate being supported by suitable mounting means including screws 267 and spacing collars 268 surrounding the same, which screws pass into threaded openings in the bottom of the frame (not shown), a screw 269 at the front which is held in spaced relation to the bottom of the sprocket cavity by a spacer 270, and by a tongue 271 projecting longitudinally and wedged between a pair of lugs 272 projecting forwardly from the outer surface of the cartridge cavity 42. The lever 265 is provided with a slot 275 which is substantially in the shape of a long, narrow ellipse and into which projects a guiding lug 276 comprising the head of a rivet set in plate 266. The end of lever 265 away from the finger 252 is provided with a pair of upwardly projecting, hooked flanges 277 between which there is an open slot indicated at 278. The lever 265 is provided with a depending guide pin 280 which projects through a longitudinal guide slot 281 in the plate 266, the pin engaging the hooked end of a spring 282, the other end of which is anchored to the screw 269, the spring thus tending to hold the shutter resetting lever 265 in the position illustrated in Figs. 11 and 13 with the lever being maintained against the guiding lug 276. In this position the hooked flanges 277 are engageable by one or the other of a pair of driving pins 285 diametrically opposed to each other on an hourglass-shaped cam 286 fixed to the lower end of the sprocket gear shaft 66. When the sprocket gear is rotated in either direction the pins 285 successively engage one of the hooked flanges 277 and drive the finger 252 toward resetting position. Engagement of the pins 285 with the flange 277 will occur throughout the greater part of a half revolution as the lever 265 and finger 252 move the shutter blades to reset position, but when the half revolution of the sprockets is nearly completed the pin 285 will pass through the slot 278, permitting spring 282 to snap the resetting lever back to its initial position in readiness to engage the shutters when released the next time.

*Shutter latching and release mechanism*

The hourglass cam 286 (Fig. 13) is in position to engage an end of a driving lever 290 which is journaled on a timer cam hub 293 which, in turn, is journaled in the plate 266, the lever having an oppositely extending end 292. A peripheral groove in hub 293 loosely retains a hairpin driving spring 294 bent around the groove with one end hooked about a floating lever driving pin 295 fixed in the lever end 292. The other end of the hairpin-shaped spring 294 hooks into an ear 297 on a driving lever release pawl 298 which is pivotally mounted on a pivot 299 mounted on the plate 266. The spring is so tensioned as to tend to rock both the pawl 298 and the driving lever 290 counterclockwise (Fig. 13). The driving lever release pawl 298 is provided with a downwardly turned end flange 300 which engages the front edge of the extension 292 of the driving lever to lock the driving lever in the cocked position illustrated in Fig. 13. The release pawl is provided with a downwardly turned flange 301 which is engageable with a release lever 302, also pivoted at 299.

The release lever is normally maintained in the relation shown in Fig. 13 by a spring 303 hooked into the end of a downwardly turned flange 304 on the lever and anchored to a suitable portion of the frame (not shown), the spring urging a projection 305 on the release lever against a stop 306 projecting downwardly from the frame 10. The release lever is provided with an arm 307 bearing against the surface of plate 266 to keep the lever parallel to the plate. The release lever may be rocked clockwise from the illustrated position by pushing inwardly on a release button 308 in a recess in the front cover and fixed to the end of a release push rod 309, the rod being slidably guided in the front cover 11. The inner end of the rod is bent upwardly at 310 in such fashion as to be engageable in a small opening in the release lever, the connection being such that when the front cover is unfastened from the frame the hooked end 310 may be disconnected from the release lever in order to permit removal of the front cover. When the release button is pushed inwardly the release lever is rocked clockwise, thus pushing against the flange 301 on the release lever pawl to rock the release lever pawl clockwise about its pivot 299, thereby removing the flange 300 from engagement with the front edge of the driving lever and permitting the hairpin spring 294 to move the driving lever counterclockwise. As soon as counterclockwise motion of the driving lever commences the end edge of the portion 292 engages the outer surface of the flange 300 to lock the driving lever release pawl 298 in releasing position until resetting action is completed, in spite of the fact that the button 308 may have been released to permit the release lever to be returned to its normal position by spring 303.

The driving lever release pawl 298 is provided with a forked arm 315 which embraces the rounded end of a slide lock shaft actuating lever 316 fixed to the lower end of the slide lock shaft 147. The lever 316 is in line with the slide lock 146 (Fig. 12) so that when the button 308 is pushed inwardly the slide lock 146 is aligned with the longitudinal grooves 130 in the slides 131, thus releasing the feeding mechanism as soon as the shutters are tripped. It has been explained that one or the other slide 131 will be moved longitudinally during the first few degrees' rotation of the sprocket driving gear 58 (as driven by the knob 59) and then returned to its initial position by the spring 137. When the driving lever is released the lower end of pin 295 strikes the edge 296 of the plate 266 which acts as a limit. Also, the arm 290 rocks to a position close to the hourglass cam 286. During approximately the first quarter turn of the sprockets and cam the lever 290 is rocked clockwise by one of the four curved faces of cam 286. During approximately the first sixty degrees' rotation of the hourglass cam the flange 300 on the release pawl is engaged with the end edge of the extension 292 on the driving lever so that the release pawl is maintained in position such as to hold the lock 146 in alignment with the slots 130. Following the return of the actuating slide 131 the flange 300 is released, thus permitting the driving spring 294 to snap the release pawl back to the position illustrated in Fig. 13 with the flange 301 acting as a limit, thus immediately rotating the lock 146 to the position illustrated in full line in Fig. 12 to prevent further movement of either of the slides 131. When the release pawl 298 is thus snapped back the flange 300 re-engages the front edge of lever arm 292 to hold the driving lever in the position illustrated in Fig. 13 after the cam 286 leaves the arm 290.

The primary shutter latch 256 is pivotally mounted on plate 266 at 320 (Fig. 13) so as to be capable of swinging from the latching position illustrated to a released position in which it bears against a tab 321 struck upwardly from plate 266 (Figs. 11 and 13). It is held in latching position by a primary shutter latch pawl 322 pivoted at 323 and urged clockwise by a spring 324. A releasing lug 325 on the driving lever 290 engages a cam portion 326 on the pawl to disengage it from the latch at the proper instant, this instant remaining constantly fixed regardless of the shutter timing. When the resetting lever 265 moves the shutter blades to the reset position, tongues 258 and 259 of shutter blade 235 engage latches 256 and 254, rotating them counterclockwise to the reset position shown. When tongue 258 rotates the latch 256 to the reset position, pawl 322 hooks over the latch to bring portion 326 into contact with lug 325 of lever 290.

The secondary shutter latch 254 is pivotally mounted at 330 and is held in latching position by a hook 331 (Figs. 11 and 14) on an arm of a floating lever 332 under plate 266. The hook 331 is normally maintained forwardly, as seen in Fig. 14, by a spring 333 anchored to a pin 334 projecting downwardly from plate 266 and hooked over a pin 335 projecting in both directions from the floating lever, the upper end projecting through an opening 336 in plate 266 (Fig. 13). The lower end of pin 335 is rounded (Fig. 11) so as to slide freely over the upper surface of an escapement mounting plate 337 held in spaced relation to plate 266 by screws 338, 339 and 340 surrounded by suitable spacer sleeves (Fig. 14). When hook 331 is displaced rearwardly from the position illustrated in Fig. 14 the secondary latch 254 is released to permit the rear shutter 225 to move to released position, the latch swinging against pin 334 where it remains in position to be returned by tongue 259 on the front shutter 235 at the next resetting operation. During the resetting action the hook 331 is brought back to bear against the cam face 341 on the secondary latch, the cam face slightly displacing the hook rearwardly until it can be snapped into holding position by spring 333.

Shutter timing

The timer cam shaft 291 extends above the feeding gear trains (Fig. 11) and is provided with a driver tip 350 which slidably engages in a driving slot (not shown) in a timing adjustment dial 351 (Fig. 2) journaled on the top cover 18. The dial is provided with indicia designating fractions of a second and the word "Bulb," any selected indicia being positionable opposite a fixed pointer 352 on an exposure indicator cover plate 353. As the dial is rotated shaft 291 rotates a timer cam 355 (Figs. 11 and 14) beneath plate 266. The timer cam is provided with a spiral edge 356 and a reduced section 357 on relatively small radius, the spiral face corresponding in extent to the numeral bearing portion of dial 351 and the reduced section corresponding in extent to the word "Bulb." Any point on the cam corresponding to a selected point on the dial may thus be positioned in operative alignment with a fulcrum portion 380 on the floating lever 332. When the driving lever is released the spring 294, operating through the pin 295, and the spring 333, cause the nose of fulcrum portion 380 to move forward into engagement with cam 355, the rounded lower end of pin 335 sliding over the surface of plate 337 to permit such movement. When the cam arrests forward movement of the fulcrum portion the pin 295 and the adjacent end of the floating lever continue to move forward, thus pivoting the floating lever to move the hook 331 rearwardly from engagement with the secondary latch 254 to release the rear shutter 225. The fulcrum portion 380 may only engage the spiral portion 356, the release of the latch occurring soonest when the fulcrum engages the greatest radius portion thereof, and progressively later as the spiral decreases in radius.

In order that the releasing action may be timed accurately, the floating lever is connected to an escapement mechanism as follows: An escapement sector gear 382 is pivotally mounted at 383 on plate 337 and carries a sector gear pin 384 projecting upward into a slot 385 in the floating lever. The teeth of the sector gear mesh with a pinion 386 on shaft 387 journaled between plates 337 and 266 and fixed to an escapement ratchet 388. An escapement pawl 389 is pivotally mounted on plate 337 in position to engage and release the teeth of the ratchet as it is rotated by the hairpin spring 294 operating through the driving lever 290 and the sector gear 382. The spiral of cam 355 is such that when the fastest exposure is required the floating lever 332 pivots and releases latch 254 just after pawl 322 (Fig. 13) releases latch 256 and pawl 389 rocks over a minimum number of teeth. As the radius of the spiral decreases the pawl 389 must rock a progressively increasing number of times before the hook 331 releases pawl 254, thus increasing the time interval between release of rear and front shutter blades, and of the film exposure.

"Bulb" action

When the section 357 of cam 355 is effectively aligned with the fulcrum portion 380 of the floating lever the fulcrum 380 can never contact the cam to release the secondary latch since the floating lever is arrested first by the pin 295 (Fig. 11) engaging the forward edge of opening 296 in the plate 266. Therefore, one shutter is released and comes to rest while the other shutter remains cocked, thus opening the apertures for timed exposures. This condition continues as long as the release button is held, but when it is permitted to return to its normal position the inner shutter is released as follows: The pin 335 (Fig. 13) is moved forward toward the front of opening 336 as the escapement is released, thus placing the pin in the return path of an extension 390 of the release lever 302. When the button is returned to its normal position by the spring 303, the extension 390 engages the pin 335 (Fig. 13) and the pin then becomes a fulcrum causing lever 332 and hook 331 to release latch 254 and terminate the exposure.

Diaphragm adjustment

The exposure indicator cover plate 353 also partially covers a diaphragm knob 400 (Fig. 2) which carries a plurality of aperture size indicia movable past a pointer 401. The dial is fixed to the upper end of a diaphragm pinion shaft 402 (Figs. 11 and 12) journaled in the top cover 18 and the frame 10. A pinion 403 on the lower end of shaft 402 meshes with teeth on a diaphragm rack 404 guided for longitudinal movement on top of frame 10 beneath the feeding gear train by a pair of guide pins 405 and 406 engaging slots 407 and 408 respectively, in the rack. The rack is provided with a large open eye 410 at one end which communicates with slot 408 so that the driver head 350 on the timer cam shaft 291 may be removed with the shutter escapement assembly when the rack is moved to one extreme position. The rack is provided with a pair of claws 411 which embrace a vertical extension 412 on a diaphragm yoke 413 extending across the front of the frame 10 (Figs. 11 and 12). Pivots connect the ends of the yoke to a pair of diaphragm levers 414 which extend through slots 415 in the lens barrels 416 and are operatively connected to iris diaphragms 417 (Fig. 5) in the usual manner. When the rack is moved the diaphragm openings are adjusted in accordance with the dial setting. The extension 412 slides vertically in the claws 411 as the light tunnels 64 are shifted as previously described. The yoke 413 is in front of the tunnel shifting yoke 193 so as not to interfere therewith, and the yoke 413 is upwardly curved at its middle so as to clear the selector plate shifting pinion 183 when lowered.

Exposure indicator

The central portion of top cover 18 comprises the housing for an exposure indicator such as disclosed and claimed in my aforesaid Patent No. 2,557,478. The timer dial 351 and the diaphragm knob 400 comprise portions of the indicator which cooperate with and actuate a film speed selector dial 420 through mechanism (not shown) as illustrated in said patent. The shaft to which dial 420 is fixed by a screw 421 loosely journals a light intensity dial 422 which is frictionally rotated by dial 420, or which may be slipped around by manual actuation. The dial 420 carries a "Winter" reference mark and a "Summer" reference mark, either of which is used according to the season. The dial 422 carries one group of indicia representing film emulsion speed, one of which is to be manually aligned with the proper seasonal reference mark on dial 420, the selection depending upon the film being used at the time and the aligning being accomplished by manually slipping dial 422. The opposite side of dial 422 carries a plurality of legends and reference marks representing different degrees of light intensity. Proper rotation of either the timer dial 351 or the diaphragm knob 400, or simultaneous rotation of both, will cause dial 420 frictionally to drive dial 422 until the proper light intensity reference mark on dial 422 is aligned with the proper one of a plurality of "Subject Color" reference marks on the cover plate 353. The dial 351 and knob 400 are prevented by suitable stops from rotating beyond the limits of the scales thereon. If the proper light intensity and subject color marks cannot be made to align for a desired shutter speed or diaphragm opening, the operator is thus advised that the picture would not be well exposed and that he must compromise on one or the other to have a good exposure. If alignment cannot be achieved in any fashion the operator should wait for a brighter day or take a "Bulb" exposure. In many instances alignment can be achieved in a wide variety of combinations of shutter speed and diaphragm opening, in which case selection may be determined by some factor such as the speed of movement of the subject as in photographing sporting events. Regardless of how the dials are manipulated to achieve alignments, the cam 355 and the diaphragms 417 will automatically be in readiness to effect a proper exposure.

A feature not found in the above-identified Patent No. 2,557,478 is herein disclosed, comprising depth of field indicating means associated with the diaphragm adjusting dial 400. It will be observed that the dial carries a plurality of indicia representing distance, which are rotatable past an edge of the plate 353 indicated by the reference character 425. The plate 353 preferably carries a suitable legend to the effect that any object between the distance indicated by the edge 425 and infinity will be in clear focus, a situation made possible by the use of universal focus lenses.

Flash synchronization

A switch for operating a flash attachment is provided on the front cover 11 (Figs. 9, 10, 18, 19 and 20) in position to be operated by the front shutter and related mechanism. The switch comprises a rigid contact bar 430 carrying a fixed contact 431, the bar being mounted on an insulator block 432 by a pair of insulated screws 433 threaded into a lug on the cover. The fixed contact may be contacted by a movable contact 434 on a spring contact bar 435 having tension upward, and electrically grounded to the plate 11.

A spring switch actuator 440 is mounted adjacent the spring contact bar 435 with tension downward, and is provided with a hook 441 (Fig. 9) extending over the tip of spring contact bar 435. Downward tension of actuator 440 is sufficient to overpower upward tension of spring contact bar 435 and the actuator normally holds spring contact bar 435 down against a finger 436 on plate 266.

Tab 258 (Fig. 10) of the front shutter 235 is in operational alignment with a tongue 443 on actuator 440 so that when the shutter 235 is in released position tab 258 wedges between tongue 443 and a rounded boss 442 on the front plate 11 to move actuator 440 (Fig. 19) up and thereby permit spring contact bar 435 to close the contacts 431 and 434. In this way the switch is closed at the instant the front shutter blade reaches its released position whereat light is permitted to reach the lenses.

An arm 437 (Figs. 18 and 19) on the release lever 302 normally engages spring contact bar 435 to hold the contacts open, this action being independent of the action of actuator 440. The arm 437 moves to inoperative position (Fig. 19) only when the release button 308 (Fig. 13) is depressed, at all other times holding contacts 431 and 434 (Fig. 18) apart. In this way, the arm permits the shutter 235 to close the contacts when the picture is taken, but opens the contacts as soon as the release button 308 is permitted to return to its normal position by spring 303 (Fig. 13). Thus the flash circuit is rendered safe and new flashbulbs may be inserted in the flash unit safely at any time, with the camera shutter cocked or not.

A flash contact wire 445 is soldered to the fixed contact bar 430 and runs along the base of the front cover 11 above lugs 27 (Fig. 9). It is suitably secured to the end of the cover (not shown) and led up through its light trap flange 446 (Fig. 12), its end being soldered to a plate 450 mounted on the upper end of shaft 127 (Figs. 6 and 21). The plate is held in position by a pair of insulator washers 451 and 452, a screw 453, and metal washers 454 and 455, the washer 451 having an interlocking step to insulate the plate from the screw. The plate is made of spring material and has a contact finger 458 extending therefrom into contact with the edge of a contact washer 459 mounted in the top cover 18. The washer 459 is held in position by a contact rivet 460 (Figs. 2 and 21) extending into a socket 461 in the top cover and insulated therefrom by fiber washers 462 and 463. The socket 461 is near a screw socket 464 in which a flash gun connector (not shown) may be engaged, the gun being thereby grounded to the frame. It is to be appreciated that the gun will have a second projection insertable into socket 461 to make contact with the tip of rivet 460.

Viewfinder

A viewfinder lens cover 470 (Figs. 21 and 26) is retained against suitable flanges, such as flange 471, in the top cover 18 by a pair of slotted head nuts 472 engaging studs imbedded in bosses 473. The cover 470 is provided with suitable openings through which the driver head 359 on timer cam shaft 291 and the diaphragm adjusting pinion shaft 402 project. The middle of the support is trough-shaped to provide a tunnel leading from an eye opening 475 (Fig. 26) in the rear of the top cover to a sight opening 476 (Figs. 1 and 26) in the front of the top cover. A spring lens retainer 477 is mounted in the trough, being held in spaced relation to the recessed portion of the top cover in which the dials 351 and 400 are seated, by a slotted spacer rivet 478 engaging a longitudinal slot 479 in the front of the retainer, and a bridge 480 spanning the bosses at the rear. A pair of legs 481 depend from the front end of the retainer 477 and straddle a square lens 483, the legs engaging the sides of the lower portion of the lens and being provided with lugs 482 which press against the rear of the lens, the lens being thus retained in a seat provided in the cover 18. A similar pair of legs 484 joined at their extremities by a crosspiece 485, embrace the edges of a circular lens 486 to retain it in position at the eye opening 475. The space between the retainer 477 and the top cover is available for the exposure indicator mechanism, a journal opening 496 being provided in a boss 487 in the cover through which the shaft (not shown) supporting dials 420 and 422 extends. The lower edge of opening 476 is open and the lower portion of lens 483 and the forward edge of the viewfinder cover 470 project into the space between a vertical light trap flange 488 and a horizontal light trap flange 489 on the front cover 11, the flange 488 being notched at 490 (Figs. 1 and 9) to define the lower portion of the sight opening. The forward portion of cover 470 is provided with a transverse well 491 in which is cemented a spirit level capsule 492, the capsule being out of the line of sight through the viewfinder but constantly visible when looking through the viewfinder.

Release cable mechanism

Fig. 20 illustrates an improved release cable mechanism which is built into the camera, comprising a plunger 500 having its outer end normally resting flush with the bottom of the depression in the front cover 11 in which the release button 308 is located. The plunger is maintained in alignment with the flange 304 on release lever 302 in suitable bores through a portion of the front cover 11, the flash synchronization switch mechanism including the switch members 430 and 435, the switch actuator 440, and the bracket 499. The bracket 499 has a forwardly extending arm 501 having an end flange guiding the inner end of the plunger 500. An intermediate portion of the plunger 500 is provided with an annular recess in which is seated a split ring 502 forming a retainer for one end of a compression spring 503, the other end of which bears against the upwardly extending flange of the arm 501. The plunger may be moved forward to contact the flange 304 and swing the release lever 302 until the flange strikes a limit abutment 504 on the frame 10. The outer end portion of plunger 500 is normally located within a threaded recess 505 into which may be inserted the threaded end of a release cable connector 506, thereby positioning the end of a flexible release wire 507, retained in a flexible sheath 508, adjacent the outer end of the plunger 500. The wire 507 and the sheath 508 constitute a flexible release cable, the opposite end of which supports a release mechanism operating button or the like (not shown) of any desired type for the usual purposes of such devices. The present invention is an improvement over any similar construction heretofore devised in that the plunger 500 closely fits the bore in the cover 11 inwardly from the threaded recess 505 so as to provide a dust seal for preventing the entry of foreign material into the camera. The length of the portion of the plunger which is guided in the switch mounting assembly is such that the outer end portion of the plunger is always maintained within the bore so that even though foreign material should collect on the outer end of the plunger it may not be carried into the interior of the camera when the release cable is actuated.

*Pressure pads and pressure springs*

In Figs. 7 and 8 it may be seen that the inner surface of the rear cover 12 supports a pressure pad and pressure spring mounting plate 520 which extends substantially from end to end of the cover, the ends thereof being bent toward the cover to prevent catching the film. The pad is supported by a longitudinally spaced pair of shoulder rivets 521 located substantially along the longitudinal center line and a pair of intermediate, laterally spaced rivets 522 surrounded by spacers 523. The rivets 522 hold a connecting portion of a pressure pad mounting spring 524 against the surface of the plate 520, the spring having a pair of longitudinally projecting pressure pad mounting arms 525 projecting toward the cartridge receiving space and bent outwardly from the plane of the mounting plate at their intermediate portions. The opposite end of each arm 525 is provided with a keyhole slot 526 embracing the stem of a shoulder rivet 527, the length of the slots being such as to limit outward movement of the intermediate portions in order to provide a rugged construction. The raised intermediate portions of the arms 525 each support a pressure pad 528 lying parallel to the rear cover 12, and in position to hold the film against the rails 66 and 67 of one of the light tunnels. The inner edges of each of the pressure pads is provided with a plurality of spaced fingers 529 whereby the adjacent edges of the pressure pads are overlapped, thus permitting shifting of the light tunnels and independent pressing of the portion of the strip being exposed without interference from the remainder of the strip. A laterally spaced pair of rivets 530 at the other end of the mounting plate engage and retain a similar spring member supporting a similar pair of pressure pads in the same manner, the arms of this pressure pad spring projecting in the opposite direction, but the construction being otherwise identical.

The lower ends of the spacers 523 anchor one end of a pressure spring 535 which extends in the direction away from the cartridge receiving space and terminates slightly beyond the rivets 530, the spring being flexed to press against the lower surface of the mounting plate 520. The mounting plate 520 is provided with a longitudinally extending edge notch 536 at each edge between the ends of spring 535, and a slot 537 is provided in the plate parallel to and inwardly spaced from each edge notch 536, being separated therefrom by a longitudinal bar portion 538. A portion of the spring 535 at each side thereof is arranged to provide a reversely projecting tongue extending rearwardly in the region defined by the notches 536 and the slots 537. Each tongue is provided with a longitudinally extending slot 540 parallel to its outer edge and defining a spaced pair of strips 541 and 542, each of which is bent upwardly at its intermediate portion to project through slots 537 and the notches 536 respectively. The bar portions 538 of the mounting plate lie opposite the sprockets 53 of the film advancing mechanism and the portions 541 and 542 of the pressure spring engage the film on opposite sides of the sprockets and hold the film sprocket holes in engagement with the teeth of the sprockets. It will be observed that the raised portions 541 and 542 are floatingly mounted at either end so that they may be depressed toward the plane of the mounting plate 520 in their entirety or at either end, thus preventing tearing of the film in the event the film is improperly placed prior to closing of the rear cover.

The opposite corners of the end of the mounting plate 520 adjacent the film receiving space are provided with protrusions 550 adapted to engage the customary flange of the film cartridge indicated in skeleton outline in Fig. 8 so as to locate the cartridge in collaboration with the members 39, and prevent the cartridge from rotating in its socket when the film is advanced.

*Exposure orientation*

In Fig. 5 it will be seen that the right light tunnel 64 is provided with a rectangular notch 560 in its left, vertical, rear end flange and the left light tunnel 64 is provided with a round edge notch 561 in its right, vertical, rear edge flange. Accordingly, when the exposures are made, each right exposure will have a square extension 562 at its left edge and each left exposure will have a round extension 563 at its right edge, as seen in Fig. 23. The notches 560 and 561 are below the centers of the light tunnels to a sufficiently noticeable extent as to cause the extensions to be noticeably below the centers of the exposures. These portions of the exposures usually contain the sky or other lighter area of the scene being pictured so as to provide a strong contrast between the extension of the exposure and the unexposed, surrounding portion of the film. When an exposure is separated from the film strip it will be provided with a marginal portion in which the extension is clearly noticeable so that each exposure will permanently carry with it an indictation of whether it is a right or a left exposure, and an indication of the upper and lower edges of the exposure. In Fig. 27 there is seen the rear surface of an exposure mounting disc 564 suitable for use in stereoscopic viewing devices or projectors as set forth in the above-mentioned patent of Gruber, the disc 564 preferably being of the type comprising two plies of material having pockets therein extending to the edge of the disc so that the transparencies may be slipped into position as set forth in the above-identified Kurz patent. Discs of this character are preferably provided with seven pairs of apertures 565, each pair of apertures being along an equiangularly spaced diameter of the disc. The disc is likewise provided with seven feeding apertures 566 engageable by feeding mechanism in the viewing or projecting device so that at each operation of the feeding mechanism the disc will be rotated one-seventh of a complete revolution, thereby causing alternate pairs of exposures successively to be placed in alignment with the viewing apertures or the projecting mechanism, as the case may be, and each pair of exposures when horizontally positioned in the mechanism will thereby be positioned in proper position for viewing if the exposures are placed in the disc in accordance with the right and left exponential characters, as shown in Fig. 27. The rear surface of the disc is provided with a plurality of indicia such as the printed half-circles 567 at the outer edges of the left apertures and the printed half-squares 568 at the outer edges of the right apertures. When mounting a pair of exposures, the operator should first place the exposure over the aperture so as to align the square extension 562 with the square indicator 568, or the round extension 563 with the round indicator 567, as the case may be, thereby making it virtually impossible for the exposures to be improperly positioned since there is only one position in which alignment of each can be achieved.

*Removable haze filter and dust seal*

In Fig. 28 it may be seen that the window 170 comprises a disc of optical glass, preferably of the type designated as a haze filter, which is mounted in a projecting, manually engageable flange of a removable framing member 171 which is threadedly engaged with threads in a socket in the front cover member 11. The member 171 is made removable in order that the window 170 may be cleaned on both surfaces. Theoretically it is impossible for dust to collect on the inner surface of the window since the camera is sealed as far as possible, but, as is well known, minute particles of foreign material will eventually find their way into the camera and collect on the inner surfaces of the windows 170. Since the inner surfaces are closely adjacent the shutters and the selector plate, it would be impossible to clean these inner surfaces were it not for the removable nature of the framing member 171. Another purpose is achieved in that the windows 170 may be removed and the shutters and selector plate manipulated to expose the lenses 70, thereby permitting cleaning of the forward surfaces of the picture-taking lenses. The rear surfaces of the lenses 70 may be reached through the open rear ends of the light tunnels when the rear cover is swung open. The inner surface of the forwardly projecting flange of the framing member 171 is preferably provided with screw threads, indicated at 570, arranged to receive standard filter mounts so that special filtering effects can be achieved without providing special filter mounts.

*General operation*

In review of the principal operating steps, it will suffice to state that the rear cover 12 is swung open to permit vertical insertion of a film cartridge, with the selector plate shifting knob 181 preferably rotated to expose the correct indicia, and the light tunnels adjacent the lower apertures in the shutter blades. The end of the leader strip is engaged with the take-up spool, whereupon the rear cover may be swung shut. If not previously done, the light tunnels must now be shifted to lower position. The operating knob 59 is rotated through three feeding steps, the shutter being tripped between each operation, so as to wind the exposed leader onto the take-up spool. The operating knob is now elevated and the proper or desired indicia thereon placed adjacent the pointer 89 so as to cause the stop member 89 to engage one of the pins 94 after the lower row of pictures has been taken. The selector plate shifting knob 181 is then rotated to its opposite position, thereby shifting the light tunnels and causing the selector plate to cooperate with the upper apertures in the shutter blades. When the selector plate is shifted the opening 161 therein moves the spring arm 169 to locate the vertical stop flange 158 in alignment with the opposite film advancing slide 131, thereby rendering the operating knob 59 capable of movement only in the reverse direction to return the film into the cartridge. The upper row of pictures is then taken. When the indicia on the operating knob comes back to the pointer to indicate that the proper number of exposures in the reverse direction have been made, the camera is operated several times to insure winding of the exposures back into the cartridge before opening the rear cover to remove the cartridge.

The camera is provided with the lens opening dial (diaphragm knob) 400 which is interconnected with the iris diaphragms, the dial being provided with indicia indicating the stop opening and, preferably, as well being provided with indicia indicating depth of field (from infinity to closest subject) corresponding to the preferable stop opening for sharp exposures with the universal focus lenses. The camera is also provided with the shutter speed setting (timing adjustment) dial 351 which is provided with indicia indicating the fraction of a second time lag between release of the inner and outer shutters, and also having a designation for bulb operation permitting manually controlled time exposures. The diaphragm and shutter adjusting dials are interconnected through the exposure indicating mechanism including the dials 420 and 422. Operation of the dials results in setting of the timer cam 355 to control the operation of the floating lever which releases the secondary shutter latch. Means are provided whereby the shutters are reset and the timing mechanism reset regardless of the direction of rotation of the knob 59.

Exposed and developed pairs of transparencies may be separated from the film strip and placed in transparency holding means for use in a stereoscopic viewing device or a projecting mechanism.

Having illustrated and described a preferred embodiment of my invention. It should be apparent to those skilled in the art that the invention permits of modification in arrangement and detail. I claim as my invention all such modifications as come within the true spirit and scope of the appended claims.

I claim:

1. A camera comprising a casing including a front wall having a window therethrough, means forming a passage from front to rear of said casing in registry with said window, light tunnel forming means extending from front to rear of said passage, means on said passage forming means for guiding said light tunnel forming means for movement in a direction normal to the longitudinal axis thereof, means for shifting said light tunnel forming means along said guiding means to one or the other of two extreme positions in registry with spaced portions of said window, a shiftable selector plate lying in a vertical plane between the front wall of said casing and said passage forming means, means guiding said selector plate for movement in said plane to one or the other of two selectable positions, said selector plate having a pair of apertures therethrough, means operatively associated with said light tunnel shifting means for shifting said selector plate, one of said apertures registering with said light tunnel forming means when in one extreme position and the other of said apertures registering with said light tunnel forming means when in the other extreme position, means for maintaining a film strip across the rear end of said passage in such relative position thereto that exposures may be made thereon through said light tunnel forming means when in either of said extreme positions, and a single shutter mechanism including spaced aperture defining portions, each of said portions being movable past one of said selector plate apertures.

2. A camera comprising a front wall having a window therethrough, means forming a passage from front to rear of the camera in registry with said window, lens means mounted adjacent the front of said passage, means for shifting said lens means to one or the other of two extreme positions in registry with spaced portions of said window, a shiftable selector plate lying in a vertical plane between said front wall and said lens means, means slidably guiding said selector plate for movement in said plane to one or the other of two selectable positions, said selector plate having a pair of apertures therethrough, means operatively associated with said lens shifting means for shifting said selector plate, one of said apertures registering with said lens means when in one extreme position and the other of said apertures registering with said lens means when in the other extreme position, means for maintaining a wide film strip in such position that two rows of exposures may be made lengthwise of said film strip, means for feeding said film strip longitudinally in either direction, and means for controlling the direction of feeding movement in accordance with the position of said lens means including a pivoted spring feed mechanism locking member movable to one position to prevent operation of said feeding means in one direction and to a second position to prevent operation of said feeding means in the opposite direction and a spring member connecting said locking member to said selector plate.

3. A camera comprising means forming a passage through the camera, light tunnel forming means shiftably mounted in said passage, said passage being of such size relative to said light tunnel forming means that said light tunnel forming means may be shifted in a direction normal to the axis thereof to one or the other of two selectable positions, means for guiding said light tunnel forming means during movement, means associated with said light tunnel forming means for manually effecting movement thereof, and means for holding a film against the rear of said frame in such relative position to said passage that spaced exposures may be made thereon corresponding to the two positions of said light tunnel forming means including a pair of individually mounted, spring-urged pressure pads each adapted to force a portion of the film against the rear end of said light tunnel forming means when in one position, the adjacent edges of said pressure pads each having spaced projections thereon with the projections of one pad extending into the spaces between the projections of the other pad.

4. A camera comprising a frame, a casing surrounding said frame, said frame having a passage therethrough, light tunnel forming means extending through said passage, said passage being of such size relative to said light tunnel forming means that said light tunnel forming means may be shifted in a direction normal to the axis thereof to one or the other of two selectable positions, means associated with said frame for guiding said light tunnel forming means during movement, means associated with said light tunnel forming means for effecting movement thereof including a shaft extending through said casing, means for holding a film adjacent the rear of said frame in such relative position to said passage that spaced exposures may be made thereon corresponding to the two positions of said light tunnel forming means including a pair of pressure pads each adapted to force a portion of the film against the rear end of said light tunnel forming means when in one position, said pressure pads having complementary teeth on their adjacent edges, and means for supporting each of said pressure pads comprising a mounting plate fixed to said casing, a leaf spring having one end anchored to said mounting plate, its intermediate portion supporting the pressure pad, and a longitudinal slot in its free end, and a shoulder rivet fixed to said mounting plate and passing through said slot, said spring being biased to project said pressure pad outwardly from said plate and said slot limiting such outward movement.

5. A camera comprising a frame, means forming a passage therethrough, light tunnel forming means extending through said passage, said passage being of such size relative to said light tunnel forming means that said light tunnel forming means may be shifted in a vertical direction normal to the axis thereof to one or the other of two selectable positions, means associated with said frame for guiding said light tunnel forming means during movement, means associated with said light tunnel forming means for effecting movement thereof, and means for holding a film adjacent the rear of said frame in such relative position to said passage that spaced exposure may be made thereon corresponding to the two positions of said light tunnel forming means including a pair of individually mounted, spring-urged pressure pads each adapted to force the film against the rear end of said light tunnel forming means when in one position, said light tunnel forming means having a pair of vertically spaced, inwardly beveled horizontal flanges projecting from the rear end thereof into engagement with said pads.

6. In a camera, means for feeding a film strip longitudinally, means for making exposures on said film strip comprising a light tunnel including an end edge adjacent said film strip, and means for shifting said light tunnel transversely with respect to the edges of said film strip, the end edge of said light tunnel including an upper flange and a lower flange projecting slightly beyond the remainder thereof and normally engaging the surface of said film strip, the inner edges of said flanges being beveled whereby shifting of said light tunnel may be accomplished without having said light tunnel held against shifting by engagement with an edge of said film strip.

7. A camera comprising means forming a laterally spaced pair of passages therethrough, lens mounting means in each of said passages, each of said lens mounting means being of such relative size with respect to the passage in which it is mounted that it may be shifted vertically to one or the other of two extreme positions, means associated with each passage for guiding the vertical movement of said lens mounting means, and means for effecting simultaneous movement of said lens mounting means comprising a centrally located shaft.

8. A camera comprising a frame, said frame having a laterally spaced pair of passages therethrough, light tunnel forming means extending from front to rear of each of said passages, each of said light tunnel forming means being of such relative size with respect to the passage in which it is mounted that it may be shifted vertically to one or the other of two extreme positions, means associated with each passage for guiding the vertical movement of said light tunnel forming means, and means for effecting simultaneous movement of said light tunnel forming means comprising a shaft extending through said casing, and a manually engageable knob fixed to the outer end of said shaft.

9. A camera comprising means forming a laterally spaced pair of passages therethrough, lens means shiftably mounted in each of said passages, each of said lens means being shiftable to one or the other of two extreme positions, means associated with each passage for guiding the movement of said lens means, means for effecting simultaneous movement of said lens means comprising a shaft, means for admitting light to each of said lens means when in either of said positions comprising a shiftable selector plate lying in a vertical plane in front of said lens means, and means operatively connecting said shaft to said selector plate to effect shifting of said selector plate simultaneously with shifting of said lens means.

10. A camera comprising means forming a laterally spaced pair of passages, lens means shiftably mounted in each of said passages, each of said lens means being shiftable vertically to one or the other of two extreme positions, means associated with each passage for guiding the vertical movement of said lens means, means for effecting simultaneous movement of said lens means comprising a centrally located shaft, means for admitting light through each of said lens means when in either of said positions comprising a shiftable selector plate lying in a vertical plane in front of said lens means, and means operatively connecting said shaft to said selector plate to effect shifting of said selector plate, said selector plate having a laterally spaced lower pair of apertures therethrough registering with the lens means when lowered and a laterally spaced upper pair of apertures therethrough registering with the lens means when raised, said pairs of apertures being offset laterally from each other, and selector plate guiding means guiding said selector plate for lateral movement.

11. A camera comprising a frame, a casing surrounding said frame, said frame having a laterally spaced pair of passages therethrough, light tunnel forming means extending from front to rear of each of said passages, each of said light tunnel forming means being of such relative size with respect to the passage in which it is mounted that it may be shifted vertically to one or the other of two extreme positions, means associated with each passage for guiding the vertical movement of said light tunnel forming means, means for effecting simultaneous movement of said light tunnel forming means comprising a centrally located shaft extending through said casing, means for admitting light through each of said light tunnel forming means when in either of said positions comprising a shiftable selector plate lying in a vertical plane between said frame and the front wall of said casing, and means operatively connecting said shaft to said selector plate to effect shifting of said selector plate simultaneously with shifting of said light tunnel forming means comprising a pinion operatively connected to said shaft and rack teeth on said selector plate meshing with said pinion.

12. A camera comprising means forming a laterally spaced pair of passages, lens supporting means extending from front to rear of each of said passages, each of said lens supporting means being of such relative size with respect to the passage in which it is mounted that it may be shifted to one or the other of two extreme positions, means associated with each passage for guiding the movement of said lens supporting means, means for effecting simultaneous movement of said lens supporting means comprising a shaft, means for admitting light through each of said lens supporting means when in either of said positions comprising a shiftable selector plate, and means operatively connecting said shaft to said selector plate to effect shifting of said selector plate comprising a gear operatively connected to said shaft and rack teeth on said selector plate meshing with said gear, said selector plate having a slot in which said gear is located and said rack teeth being formed on one of the edges of said slot.

13. A camera comprising a frame, a casing surrounding said frame, said frame having a laterally spaced pair of passages therethrough, light tunnel forming means extending from front to rear of each of said passages, each of said light tunnel forming means being of such relative size with respect to the passage in which it is mounted that it may be shifted vertically to one or the other of two extreme positions, means associated with each passage for guiding the vertical movement of said light tunnel forming means, and means for effecting movement of said light tunnel forming means comprising a centrally located shaft extending through said casing, a crank pin fixed to the inner end of said shaft, and a yoke extending across the front of said frame and pivotally connected to each of said light tunnel forming means, said yoke having a slot therein in which said crank pin is engaged.

14. A camera comprising means forming a laterally spaced pair of passages, light tunnel forming means extending from front to rear of each of said passages, each of said light tunnel forming means being of such relative size with respect to the passage in which it is mounted that it may be shifted to one or the other of two extreme positions, means associated with each passage for guiding the movement of said light tunnel forming means, and means for effecting movement of said light tunnel forming means comprising a shaft, a crank pin fixed to the inner end of said shaft, a yoke pivotally connected to each of said light tunnel forming means, said yoke having a slot therein in which said crank pin is engaged, and a pair of sector gear members pivotally mounted adjacent said yoke, said sector gear members having intermeshing teeth and including arms extending in opposite directions with the outer end of each pivotally and slidably engaged with one of said light tunnel forming means.

15. A camera comprising a frame, a casing surrounding said frame, said frame having a laterally spaced pair of passages therethrough, light tunnel forming means extending from front to rear of each of said passages, each of said light tunnel forming means being of such relative size with respect to the passage in which it is mounted that it may be shifted vertically to one or the other of two extreme positions, means associated with each passage for guiding the vertical movement of said light tunnel forming means, means for effecting simultaneous movement of said light tunnel forming means comprising a centrally located shaft extending through said casing, a crank pin fixed to the inner end of said shaft, a yoke extending horizontally across the front of said frame and pivotally connected to each of said light tunnel forming means, said yoke having a horizontal slot therein in which said crank pin is engaged, and means associated with said crank pin and said yoke for releasably latching said light tunnel forming means in either of the selected positions.

16. A camera comprising a laterally spaced pair of lenses, means to maintain a wide film in position to expose portions thereof through said lenses, means for shifting said lenses vertically from one extreme position to another whereby two vertically spaced rows of exposures may be made on the film strip, adjustable diaphragm means mounted adjacent each of said lenses and shiftable therewith, and means simultaneously to adjust said diaphragm means comprising a lever projecting from each, a link connecting said levers and including a vertical leg, and a laterally shiftable adjusting member, said vertical leg slidably engaging said member in the vertical sense only whereby lateral adjustment of said member effects adjustment of said diaphragm means in either position of said lenses.

17. A camera comprising a front wall having a window therethrough, means forming a passage from front to rear of the camera in registry with said window, lens means mounted adjacent the front of said passage, means for shifting said lens means to one or the other of two extreme positions in registry with spaced portions of said window, a shiftable selector plate lying in a vertical plane between said front wall and said lens means, means slidably guiding said selector plate for movement in said plane to one or the other of two selectable positions, said selector plate having a pair of apertures therethrough, means operatively associated with said lens shifting means for simultaneously shifting said selector plate, one of said apertures registering with said lens means when in one extreme position and the other of said apertures registering with said lens means when in the other extreme position, means for maintaining a wide film strip in such position that two rows of exposures may be made lengthwise of said film strip, means for feeding said film strip longitudinally in either direction, means for controlling the direction of feeding movement in accordance with the position of said lens means including a pivoted feed mechanism locking member movable to one position to prevent operation of said feeding means in one direction and to a second position to prevent operation of said feeding means in the opposite direction, and means operatively interconnecting said locking member and said selector plate to effect movement of said locking member simultaneously with the shifting of said lens means and said selector plate.

18. A camera comprising a laterally spaced pair of lenses, means to maintain a film strip in laterally extending relation in position to expose portions thereof through said lenses, means for shifting said lenses vertically from one extreme position to another whereby two vertically spaced rows of exposures may be made on the film strip, adjustable diaphragm means mounted adjacent each of said lenses and shiftable therewith, and means simultaneously to adjust said diaphragm means comprising a lever projecting from each, a link pivotally interconnecting said levers for simultaneous coextensive movement in the same direction, and diaphragm adjusting means including a shiftable adjusting member movable in the longitudinal direction of said link and means rigidly interconnecting said adjusting member and said link in the direction of elongation of said link but slidably interconnecting said adjusting member and said link in the direction of movement of said lenses whereby adjustment of said diaphragms may be accomplished at either of said extreme positions.

References Cited in the file of this patent

UNITED STATES PATENTS

| Number | Name | Date |
|---|---|---|
| 740,484 | Stocoum | Oct. 6, 1903 |
| 1,592,910 | Stewart | July 20, 1926 |
| 1,662,304 | Doogood | Mar. 13, 1928 |
| 1,674,540 | Bagley | June 19, 1928 |
| 2,256,965 | Sexton | Sept. 23, 1941 |
| 2,319,086 | Riddell | May 11, 1943 |
| 2,324,075 | Gillon | July 13, 1943 |
| 2,333,776 | Gillon | Nov. 9, 1943 |
| 2,345,999 | Babcock | Apr. 4, 1944 |
| 2,418,594 | Morse | Apr. 8, 1947 |
| 2,453,075 | Land | Nov. 2, 1948 |
| 2,476,576 | Bachelder | July 19, 1949 |
| 2,541,555 | Sorkin | Feb. 13, 1951 |